US007850859B2

(12) United States Patent
Tanner et al.

(10) Patent No.: US 7,850,859 B2
(45) Date of Patent: *Dec. 14, 2010

(54) WATER TREATING METHODS

(75) Inventors: John D. Tanner, Plymouth, MN (US); David James Emmons, Plymouth, MN (US); Richard P. Riedel, Mason, OH (US); Michael Donovan Mitchell, Cincinnati, OH (US); Dimitris Ioannis Collias, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/465,159

(22) Filed: May 13, 2009

(65) Prior Publication Data
US 2010/0006507 A1 Jan. 14, 2010

Related U.S. Application Data

(60) Division of application No. 10/643,669, filed on Aug. 19, 2003, now Pat. No. 7,615,152, which is a continuation-in-part of application No. 10/464,209, filed on Jun. 18, 2003, now abandoned, which is a continuation of application No. PCT/US03/05416, filed on Feb. 21, 2003, and a continuation of application No. PCT/US03/05409, filed on Feb. 21, 2003, said application No. 10/643,669 is a continuation-in-part of application No. 10/464,210, filed on Jun. 18, 2003, now Pat. No. 7,614,506, which is a continuation-in-part of application No. 09/935,962, filed on Aug. 23, 2001, now abandoned, and a continuation-in-part of application No. 09/935,810, filed on Aug. 23, 2001, now abandoned, said application No. 10/643,669 is a continuation-in-part of application No. 09/935,962, and a continuation-in-part of application No. 09/935,810.

(51) Int. Cl.
*B01D 37/00* (2006.01)
*B01D 35/00* (2006.01)
*B01D 39/00* (2006.01)
*B01D 27/00* (2006.01)
*B01D 29/00* (2006.01)

(52) U.S. Cl. .............. 210/767; 210/257.1; 210/266; 210/282; 210/473; 210/501; 210/502.1; 210/504; 210/505; 210/649; 210/692; 210/694

(58) Field of Classification Search ............... 210/501, 210/502, 504, 505, 506, 508, 266, 282, 497.1, 210/473, 477, 252, 257.1, 257.2, 259, 649, 210/692, 694, 767
See application file for complete search history.

(56) References Cited

U.S. PATENT DOCUMENTS
9,622 A 3/1853 Best
(Continued)

FOREIGN PATENT DOCUMENTS
DE 2 357 585 11/1972
(Continued)

OTHER PUBLICATIONS

Barrett, Joyner, and Halenda (BJH) Process, "The Determination of Pore Volume and Area Distributions in Porous Substances I. Computations from Nitrogen Isotherns," J. Amer. Chem. Soc., vol. 73, pp. 373-380 (1951).

(Continued)

*Primary Examiner*—John Kim
(74) *Attorney, Agent, or Firm*—Cynthia L. Clay; Kim W. Zerby

(57) ABSTRACT

A method of treating low-pressure untreated drinking water includes providing a low-pressure water filter device, running low-pressure untreated drinking water from a source of low-pressure untreated drinking water through a low-pressure water filter of the low-pressure water filter device, removing bacteria and viruses from the low pressure untreated drinking water at a level of Filter Bacteria Log Removal of greater than about 2 logs and a Filter Viruses Log Removal of greater than about 1 log, and filling a storage housing with treated drinking water at greater than about 5 mL/min. The low-pressure water filter device may include a connector for connecting to an untreated drinking water source, a low-pressure water filter comprising mesoporous activated carbon particles and a storage housing. The average fluid contact time with the low-pressure water filter may be greater than about 2 seconds.

23 Claims, 9 Drawing Sheets

U.S. PATENT DOCUMENTS

| | | |
|---|---|---|
| 25,398 A | 9/1859 | Duchamp |
| 531,838 A | 1/1895 | Davis et al. |
| 543,922 A | 8/1895 | Buckley |
| 590,020 A | 9/1897 | Myers |
| 602,883 A | 4/1898 | Tyden |
| 611,691 A | 10/1898 | Langdon et al. |
| 673,722 A | 5/1901 | Moulton |
| D34,658 S | 6/1901 | Weaver |
| 826,654 A | 7/1906 | Firth |
| 963,324 A | 7/1910 | Randall |
| 967,905 A | 8/1910 | Hagg |
| D41,321 S | 4/1911 | Anderson |
| 1,043,933 A | 11/1912 | Hildebrand |
| 1,363,589 A | 12/1920 | Hartman |
| 1,539,775 A | 5/1925 | Sauer |
| 1,579,158 A | 3/1926 | Smile |
| 1,621,684 A | 3/1927 | Rabjohn et al. |
| 1,674,203 A | 6/1928 | Holz et al. |
| D76,391 S | 9/1928 | Groak |
| 1,752,060 A | 3/1930 | Burright et al. |
| 1,782,850 A | 11/1930 | Linden Hill |
| 1,806,977 A | 5/1931 | Kenney |
| D93,910 S | 11/1934 | Camp |
| D113,679 S | 3/1939 | Neely |
| D128,316 S | 7/1941 | Roffy |
| 2,268,076 A | 12/1941 | Lawlor |
| D133,177 S | 7/1942 | Gross |
| D136,021 S | 7/1943 | Kraissl, Jr. |
| 2,335,458 A | 11/1943 | Senyal |
| 2,372,340 A | 3/1945 | Senyal |
| D143,545 S | 1/1946 | Pond et al. |
| 2,633,990 A | 4/1953 | Simpson et al. |
| D170,472 S | 9/1953 | Monsarrat |
| D173,603 S | 12/1954 | Atkinson |
| 2,701,792 A | 2/1955 | Owen |
| 2,750,080 A | 6/1956 | Blanchard et al. |
| 2,811,258 A | 10/1957 | Schleyer et al. |
| 2,987,187 A | 6/1961 | Comroe |
| D196,108 S | 8/1963 | Gerber |
| 3,184,064 A | 5/1965 | Sampson et al. |
| 3,242,073 A | 3/1966 | Guebert et al. |
| 3,268,444 A | 8/1966 | Renn |
| 3,278,560 A | 10/1966 | Gaertner |
| 3,283,040 A | 11/1966 | Stover |
| 3,314,897 A | 4/1967 | Gaertner |
| 3,333,703 A | 8/1967 | Scavuzzo |
| D208,752 S | 9/1967 | Payne |
| 3,342,335 A | 9/1967 | Gamundi et al. |
| 3,352,424 A | 11/1967 | Guebert et al. |
| 3,419,645 A | 12/1968 | Pietzka et al. |
| 3,428,089 A | 2/1969 | Kachergis |
| D216,978 S | 3/1970 | Greene |
| 3,539,009 A | 11/1970 | Kudlaty |
| 3,550,782 A | 12/1970 | Veloz |
| 3,558,276 A | 1/1971 | Otani |
| 3,572,553 A | 3/1971 | Ogden |
| 3,591,010 A | 7/1971 | Pall et al. |
| D221,850 S | 9/1971 | Anderson |
| 3,670,892 A | 6/1972 | Baerg et al. |
| 3,678,098 A | 7/1972 | Lewis et al. |
| 3,686,151 A | 8/1972 | Keim |
| 3,692,180 A | 9/1972 | LaRaus |
| 3,700,623 A | 10/1972 | Keim |
| D227,565 S | 7/1973 | Ehret |
| D227,886 S | 7/1973 | Martinez |
| D229,178 S | 11/1973 | Mixon |
| 3,770,625 A | 11/1973 | Wallis et al. |
| 3,784,649 A | 1/1974 | Buckman et al. |
| 3,814,642 A | 6/1974 | Araki et al. |
| D232,550 S | 8/1974 | Fushihara |
| 3,836,458 A | 9/1974 | Walls et al. |
| 3,847,787 A | 11/1974 | Okazaki et al. |
| 3,853,761 A | 12/1974 | McClory |
| 3,856,676 A | 12/1974 | Grimme et al. |
| D234,356 S | 2/1975 | Holben et al. |
| D234,357 S | 2/1975 | Humphrey |
| 3,871,950 A | 3/1975 | Hashina et al. |
| D234,843 S | 4/1975 | Taylor |
| D235,143 S | 5/1975 | Ehret |
| D235,206 S | 5/1975 | Bertrand |
| 3,886,093 A | 5/1975 | Dimitri |
| 3,888,958 A | 6/1975 | Juntgen et al. |
| D236,263 S | 8/1975 | Dussardier et al. |
| D236,264 S | 8/1975 | Taylor |
| D236,265 S | 8/1975 | Dussardier |
| 3,898,188 A | 8/1975 | Rembaum et al. |
| D236,829 S | 9/1975 | Berry, Jr. et al. |
| 3,931,009 A | 1/1976 | Davis |
| 3,939,074 A | 2/1976 | Bray |
| 3,950,253 A | 4/1976 | Stern |
| 3,950,267 A | 4/1976 | Arakawal et al. |
| D240,624 S | 7/1976 | MacMurray |
| D240,731 S | 7/1976 | Free et al. |
| 3,972,818 A | 8/1976 | Bokros |
| D242,043 S | 10/1976 | Corder et al. |
| D242,249 S | 11/1976 | Corder et al. |
| 4,007,114 A | 2/1977 | Ostreicher |
| 4,014,792 A | 3/1977 | Gossett et al. |
| 4,019,986 A | 4/1977 | Burris et al. |
| 4,021,343 A | 5/1977 | Tyler |
| 4,045,553 A | 8/1977 | Mitsumori et al. |
| 4,049,550 A | 9/1977 | Obidniak |
| 4,081,370 A | 3/1978 | Schmitt, Jr. et al. |
| 4,086,166 A | 4/1978 | Martin |
| D249,053 S | 8/1978 | Hansrote |
| D249,054 S | 8/1978 | Hansrote |
| D249,055 S | 8/1978 | Hansrote |
| D249,057 S | 8/1978 | Hansrote |
| 4,110,219 A | 8/1978 | Maples |
| D249,275 S | 9/1978 | Mackay et al. |
| D249,701 S | 9/1978 | Maples et al. |
| D251,380 S | 3/1979 | Casamitjana |
| 4,147,631 A | 4/1979 | Deines et al. |
| 4,152,262 A | 5/1979 | Rose |
| 4,172,796 A | 10/1979 | Corder |
| D253,715 S | 12/1979 | Emery |
| 4,181,694 A | 1/1980 | Hashino et al. |
| 4,190,532 A | 2/1980 | Halbfoster |
| 4,190,537 A | 2/1980 | Tondreau et al. |
| 4,205,055 A | 5/1980 | Maire et al. |
| D256,944 S | 9/1980 | Fox, Jr. |
| 4,252,650 A | 2/1981 | Mas et al. |
| D258,462 S | 3/1981 | Mixon |
| 4,277,333 A | 7/1981 | Coppola |
| 4,283,283 A | 8/1981 | Zimmerman |
| 4,292,417 A | 9/1981 | Ishii et al. |
| 4,305,782 A | 12/1981 | Ostreicher et al. |
| 4,309,247 A | 1/1982 | Hou et al. |
| 4,321,288 A | 3/1982 | Ostreicher |
| 4,340,479 A | 7/1982 | Pall |
| 4,340,480 A | 7/1982 | Pall et al. |
| 4,352,884 A | 10/1982 | Nakashima et al. |
| 4,361,486 A | 11/1982 | Hou et al. |
| 4,366,068 A | 12/1982 | Ostreicher et al. |
| 4,368,123 A | 1/1983 | Stanley |
| D268,866 S | 5/1983 | Desai et al. |
| 4,389,311 A | 6/1983 | La Freniere |
| 4,391,712 A | 7/1983 | Tyler et al. |
| 4,396,512 A | 8/1983 | Beauman et al. |
| 4,399,035 A | 8/1983 | Nohmi et al. |
| 4,430,226 A | 2/1984 | Hegde et al. |
| 4,434,206 A | 2/1984 | Fukuda et al. |
| 4,448,695 A | 5/1984 | Gordon, Jr. et al. |
| D274,930 S | 7/1984 | Joe |

| | | | | | | |
|---|---|---|---|---|---|---|
| 4,473,474 A | 9/1984 | Ostreicher et al. | | 4,880,535 A | 11/1989 | Burrows |
| 4,482,641 A | 11/1984 | Wennerberg | | 4,885,081 A | 12/1989 | Oliver |
| 4,504,389 A | 3/1985 | Rundzaitis | | 4,885,085 A | 12/1989 | Beall, Jr. |
| D278,650 S | 4/1985 | Slovak et al. | | D306,754 S | 3/1990 | Petrucci et al. |
| 4,515,692 A | 5/1985 | Chandler et al. | | D307,173 S | 4/1990 | Boehnke |
| 4,523,995 A | 6/1985 | Pall et al. | | 4,915,839 A | 4/1990 | Marinaccio et al. |
| 4,552,863 A | 11/1985 | Fujimori | | D307,933 S | 5/1990 | Baer |
| D282,767 S | 2/1986 | Shofner | | 4,923,091 A | 5/1990 | Sutera |
| 4,572,785 A | 2/1986 | Braaten | | 4,936,984 A | 6/1990 | Blandford et al. |
| 4,573,464 A | 3/1986 | Yo | | D309,487 S | 7/1990 | Lieberman |
| 4,576,929 A | 3/1986 | Shimazaki | | D309,494 S | 7/1990 | Riley |
| 4,578,150 A | 3/1986 | Hou | | 4,946,600 A | 8/1990 | Shin |
| 4,585,554 A | 4/1986 | Burrows | | 4,968,440 A | 11/1990 | Woodruff |
| 4,595,497 A | 6/1986 | Burrows | | 4,969,991 A | 11/1990 | Valadez |
| 4,606,828 A | 8/1986 | Wells | | 4,969,996 A | 11/1990 | Hankammer |
| 4,609,466 A | 9/1986 | McCausland et al. | | D312,679 S | 12/1990 | Carrano et al. |
| 4,623,451 A | 11/1986 | Oliver | | 4,978,650 A | 12/1990 | Coughlin et al. |
| 4,623,467 A | 11/1986 | Hamlin | | D314,226 S | 1/1991 | Devine et al. |
| 4,626,346 A | 12/1986 | Hall | | 4,981,591 A | 1/1991 | Ostreicher |
| D288,115 S | 2/1987 | McCausland et al. | | 4,983,288 A | 1/1991 | Karbachsch et al. |
| 4,645,567 A | 2/1987 | Hou et al. | | 4,983,717 A | 1/1991 | Yamasaki et al. |
| 4,654,075 A | 3/1987 | Cipollini | | D314,607 S | 2/1991 | Kapec et al. |
| D289,429 S | 4/1987 | Thumberger | | 4,994,184 A | 2/1991 | Thalmann et al. |
| 4,657,674 A | 4/1987 | Burrows | | 4,997,553 A | 3/1991 | Clack |
| D290,386 S | 6/1987 | Padilla | | 5,004,535 A | 4/1991 | Bosko et al. |
| D290,638 S | 6/1987 | Bishop | | 5,017,292 A | 5/1991 | DiLeo et al. |
| 4,670,144 A | 6/1987 | McCausland et al. | | 5,024,764 A | 6/1991 | Holler |
| 4,670,482 A | 6/1987 | Dilling | | D318,092 S | 7/1991 | Ferguson |
| 4,673,504 A | 6/1987 | Ostreicher et al. | | D318,093 S | 7/1991 | Ferguson |
| 4,678,565 A | 7/1987 | Norton | | D318,315 S | 7/1991 | Sanborn |
| 4,681,677 A | 7/1987 | Kuh et al. | | 5,035,802 A | 7/1991 | Yamasaki et al. |
| 4,683,054 A | 7/1987 | Turnbull | | D319,288 S | 8/1991 | Spokoiny |
| 4,686,037 A | 8/1987 | Lang | | 5,037,547 A | 8/1991 | Burrows |
| 4,695,375 A | 9/1987 | Tyler | | 5,037,550 A | 8/1991 | Montagnon et al. |
| 4,696,742 A | 9/1987 | Shimazaki | | 5,039,402 A | 8/1991 | Himelstein |
| D292,429 S | 10/1987 | Spink | | D319,864 S | 9/1991 | Geneve et al. |
| 4,698,164 A | 10/1987 | Ellis | | 5,049,270 A | 9/1991 | Carrano et al. |
| 4,704,324 A | 11/1987 | Davis et al. | | 5,051,189 A | 9/1991 | Farrah |
| 4,708,803 A | 11/1987 | Ostreicher et al. | | D321,550 S | 11/1991 | Laughlen et al. |
| D293,367 S | 12/1987 | Spink | | 5,068,030 A | 11/1991 | Chen |
| 4,722,964 A | 2/1988 | Chan et al. | | 5,069,782 A | 12/1991 | Moyher, Jr. et al. |
| 4,734,208 A | 3/1988 | Pall et al. | | D323,017 S | 1/1992 | Bernstein |
| 4,734,394 A | 3/1988 | Kosaka et al. | | D323,203 S | 1/1992 | Pedersen |
| D295,887 S | 5/1988 | Hopkins | | 5,078,864 A | 1/1992 | Whittier |
| D296,000 S | 5/1988 | Padilla | | 5,082,557 A | 1/1992 | Grayson et al. |
| 4,743,366 A | 5/1988 | Burrows | | 5,083,442 A | 1/1992 | Vlock |
| 4,744,895 A | 5/1988 | Gales et al. | | 5,091,164 A | 2/1992 | Takabatake |
| D296,352 S | 6/1988 | Luzenberg | | D324,721 S | 3/1992 | Kapec et al. |
| D296,463 S | 6/1988 | Padilla | | 5,106,500 A | 4/1992 | Hembree et al. |
| 4,749,484 A | 6/1988 | Greenhut | | 5,108,590 A | 4/1992 | DiSanto |
| 4,752,389 A | 6/1988 | Burrows | | 5,110,468 A | 5/1992 | Miyashita et al. |
| 4,759,844 A | 7/1988 | Lipschultz et al. | | 5,111,966 A | 5/1992 | Fridman |
| D297,349 S | 8/1988 | Kronsbein | | 5,112,477 A | 5/1992 | Hamlin |
| 4,769,148 A | 9/1988 | Fibiger et al. | | 5,114,042 A | 5/1992 | Sutera |
| 4,772,455 A | 9/1988 | Izumi et al. | | 5,116,502 A | 5/1992 | Ferguson |
| 4,772,508 A | 9/1988 | Brassell | | D326,706 S | 6/1992 | Karlsson |
| 4,775,465 A | 10/1988 | Burrows | | 5,122,265 A | 6/1992 | Mora et al. |
| 4,776,952 A | 10/1988 | Burrows | | 5,128,034 A | 7/1992 | Kool |
| 4,778,596 A | 10/1988 | Linder et al. | | 5,128,036 A | 7/1992 | Svensson |
| 4,808,302 A | 2/1989 | Beall, Jr. | | 5,131,277 A | 7/1992 | Birdsong et al. |
| 4,816,149 A | 3/1989 | Wekell | | 5,133,878 A | 7/1992 | Gisell et al. |
| 4,822,765 A | 4/1989 | Nishimura | | D328,777 S | 8/1992 | Thalmann et al. |
| 4,828,698 A | 5/1989 | Jewell et al. | | 5,143,889 A | 9/1992 | Takahiro et al. |
| 4,830,223 A | 5/1989 | Priest | | 5,147,533 A | 9/1992 | Lipshultz et al. |
| 4,830,744 A | 5/1989 | Burrows | | D330,587 S | 10/1992 | Seeley |
| 4,831,011 A | 5/1989 | Oikawa et al. | | 5,160,608 A | 11/1992 | Norton |
| D301,913 S | 6/1989 | Brown et al. | | D331,446 S | 12/1992 | Gidman |
| 4,842,724 A | 6/1989 | Bray et al. | | D332,131 S | 12/1992 | Chez |
| 4,853,117 A | 8/1989 | Burrows | | 5,183,607 A | 2/1993 | Beall et al. |
| 4,859,340 A | 8/1989 | Hou et al. | | 5,187,237 A | 2/1993 | Nordmann et al. |
| D303,703 S | 9/1989 | Padilla et al. | | 5,188,727 A | 2/1993 | Kurth et al. |
| D304,363 S | 10/1989 | Ruesch | | 5,189,092 A | 2/1993 | Koslow |
| 4,879,027 A | 11/1989 | Sanders | | 5,193,892 A | 3/1993 | Swindell |

| | | | | | | |
|---|---|---|---|---|---|---|
| 5,203,803 | A | 4/1993 | Schoenmeyr | 5,560,393 A | 10/1996 | Clack |
| 5,204,310 | A | 4/1993 | Tolles et al. | 5,562,824 A | 10/1996 | Magnusson |
| D336,760 | S | 6/1993 | Raunkjaer | 5,565,100 A | 10/1996 | Deng |
| 5,223,132 | A | 6/1993 | Yoon | 5,567,311 A | 10/1996 | Jang |
| 5,227,238 | A | 7/1993 | Hirai et al. | 5,580,444 A | 12/1996 | Burrows |
| 5,232,590 | A | 8/1993 | Reid | 5,582,717 A | 12/1996 | Di Santo |
| 5,238,559 | A | 8/1993 | Nieweg | 5,587,089 A | 12/1996 | Vogel et al. |
| 5,238,570 | A | 8/1993 | Hugi et al. | D377,388 S | 1/1997 | Weber et al. |
| 5,248,417 | A | 9/1993 | Reid | D377,515 S | 1/1997 | Hembree et al. |
| D340,967 | S | 11/1993 | Muir | 5,607,595 A | 3/1997 | Hiasa et al. |
| 5,261,792 | A | 11/1993 | Schoenmeyr | D378,883 S | 4/1997 | Magnusson |
| 5,268,093 | A | 12/1993 | Hembree et al. | 5,620,790 A | 4/1997 | Holzki et al. |
| 5,277,805 | A | 1/1994 | Ferguson | 5,626,749 A | 5/1997 | Lambert et al. |
| 5,281,309 | A | 1/1994 | Greene | 5,639,374 A | 6/1997 | Monroe et al. |
| D344,322 | S | 2/1994 | Kasner et al. | 5,643,444 A | 7/1997 | Garrigues et al. |
| 5,282,972 | A | 2/1994 | Hanna et al. | 5,645,719 A | 7/1997 | Ha et al. |
| 5,290,442 | A | 3/1994 | Clack | 5,645,720 A | 7/1997 | Godines |
| 5,296,148 | A | 3/1994 | Colangelo et al. | 5,656,160 A | 8/1997 | Parise et al. |
| D347,462 | S | 5/1994 | Douglas | 5,658,372 A | 8/1997 | Gadkaree |
| 5,308,703 | A | 5/1994 | Tsujimoto et al. | 5,658,457 A | 8/1997 | Schoenmeyr |
| 5,310,593 | A | 5/1994 | Tsujimoto et al. | D383,192 S | 9/1997 | Johnson |
| 5,316,673 | A | 5/1994 | Kohlmann et al. | 5,662,779 A | 9/1997 | Greene et al. |
| 5,322,625 | A | 6/1994 | Rise | 5,662,792 A | 9/1997 | Suh |
| 5,324,424 | A | 6/1994 | Hochgatterer | 5,665,224 A | 9/1997 | Levene et al. |
| 5,324,434 | A | 6/1994 | Oikawa et al. | 5,670,124 A | 9/1997 | Itoga et al. |
| 5,328,613 | A | 7/1994 | Beall et al. | 5,676,824 A | 10/1997 | Jeon et al. |
| 5,331,037 | A | 7/1994 | Koslow | 5,679,243 A | 10/1997 | Cho |
| D350,870 | S | 9/1994 | Hansen | 5,679,248 A | 10/1997 | Blaney |
| D351,014 | S | 9/1994 | Hansen | 5,681,459 A | 10/1997 | Bowman |
| 5,348,647 | A | 9/1994 | Chen | D386,242 S | 11/1997 | Clack et al. |
| 5,349,992 | A | 9/1994 | Gallo et al. | 5,686,893 A | 11/1997 | Jeon |
| 5,356,531 | A | 10/1994 | Rantz | 5,688,588 A | 11/1997 | Cotton et al. |
| D352,200 | S | 11/1994 | Hansen | 5,698,091 A | 12/1997 | Kuennen et al. |
| 5,368,197 | A | 11/1994 | Sutera | 5,702,498 A | 12/1997 | Huang |
| D353,440 | S | 12/1994 | Ito et al. | D389,004 S | 1/1998 | Hampshire et al. |
| 5,371,221 | A | 12/1994 | Sipos et al. | 5,705,067 A | 1/1998 | Sumi et al. |
| 5,376,279 | A | 12/1994 | Judd et al. | 5,705,269 A | 1/1998 | Pimenov et al. |
| 5,393,419 | A | 2/1995 | Tiede et al. | 5,707,518 A | 1/1998 | Coates et al. |
| D356,625 | S | 3/1995 | Petrucci et al. | 5,709,794 A | 1/1998 | Emmons et al. |
| 5,395,509 | A | 3/1995 | Guerra Cisneros et al. | D390,629 S | 2/1998 | Ullmann |
| D357,058 | S | 4/1995 | Engelhard | 5,715,699 A | 2/1998 | Coates et al. |
| D358,460 | S | 5/1995 | Wren | 5,730,863 A | 3/1998 | Howlings et al. |
| D358,868 | S | 5/1995 | Hembree et al. | 5,744,236 A | 4/1998 | Rohrbach et al. |
| D360,332 | S | 7/1995 | Mann | 5,750,026 A | 5/1998 | Gadkaree et al. |
| 5,431,813 | A | 7/1995 | Daniels | 5,755,957 A | 5/1998 | Jeon |
| 5,435,909 | A | 7/1995 | Burrows | D395,705 S | 6/1998 | Ediger et al. |
| 5,443,739 | A | 8/1995 | Vogel et al. | 5,762,787 A | 6/1998 | Park et al. |
| 5,445,729 | A | 8/1995 | Monroe et al. | 5,762,797 A | 6/1998 | Patrick et al. |
| 5,446,005 | A | 8/1995 | Endo | 5,766,453 A | 6/1998 | Morellato et al. |
| 5,447,626 | A | 9/1995 | Ido | 5,772,896 A | 6/1998 | Denkewicz et al. |
| 5,449,456 | A | 9/1995 | Bowman | 5,773,143 A | 6/1998 | Vermillion et al. |
| D363,760 | S | 10/1995 | Morem et al. | 5,776,339 A | 7/1998 | Ha et al. |
| 5,454,944 | A | 10/1995 | Clack | 5,776,385 A | 7/1998 | Gadkaree et al. |
| 5,460,792 | A | 10/1995 | Rosenbaum | 5,785,848 A | 7/1998 | Strand |
| 5,464,531 | A | 11/1995 | Greene | 5,795,475 A | 8/1998 | Luedke et al. |
| 5,466,378 | A | 11/1995 | Dussert et al. | 5,795,843 A | 8/1998 | Endo |
| 5,468,387 | A | 11/1995 | Solomon | D398,367 S | 9/1998 | Andrepont et al. |
| 5,478,465 | A | 12/1995 | Larson et al. | 5,800,707 A | 9/1998 | Mehnert et al. |
| 5,487,917 | A | 1/1996 | Gadkaree | 5,804,280 A | 9/1998 | Pall et al. |
| 5,502,978 | A | 4/1996 | Field | 5,813,245 A | 9/1998 | Coates et al. |
| 5,505,120 | A | 4/1996 | Albertson | 5,813,246 A | 9/1998 | Oh |
| 5,518,613 | A | 5/1996 | Koczur et al. | 5,817,231 A | 10/1998 | Souza |
| 5,521,008 | A | 5/1996 | Lieberman et al. | 5,817,237 A | 10/1998 | Lee et al. |
| D370,521 | S | 6/1996 | Archer et al. | 5,833,849 A | 11/1998 | Primdahl |
| 5,525,214 | A | 6/1996 | Hembree | 5,834,114 A | 11/1998 | Economy et al. |
| 5,527,451 | A | 6/1996 | Hembree et al. | D402,745 S | 12/1998 | Termeer et al. |
| D372,295 | S | 7/1996 | Weber | D403,406 S | 12/1998 | Douglas |
| 5,536,394 | A | 7/1996 | Lund et al. | 5,853,572 A | 12/1998 | Kuennen et al. |
| 5,536,395 | A | 7/1996 | Kuennen et al. | 5,855,788 A | 1/1999 | Everhart et al. |
| 5,536,396 | A | 7/1996 | Mudra et al. | 5,855,796 A | 1/1999 | Joung |
| D372,515 | S | 8/1996 | Douglas | D405,156 S | 2/1999 | Vanderhoef |
| D372,760 | S | 8/1996 | Brancazio et al. | D405,867 S | 2/1999 | Denkewicz, Jr. et al. |
| 5,543,054 | A | 8/1996 | Charkoudian et al. | D405,868 S | 2/1999 | Denkewicz, Jr. et al. |

| | | |
|---|---|---|
| D406,314 S | 3/1999 | Denkewicz, Jr. et al. |
| D407,462 S | 3/1999 | Bishop et al. |
| 5,882,507 A | 3/1999 | Tanner et al. |
| D409,715 S | 5/1999 | Cruz et al. |
| 5,900,138 A | 5/1999 | Moretto |
| 5,900,141 A | 5/1999 | Takigawa et al. |
| 5,900,143 A | 5/1999 | Dalton et al. |
| 5,904,854 A | 5/1999 | Shmidt et al. |
| D410,726 S | 6/1999 | Cook |
| 5,907,958 A | 6/1999 | Coates et al. |
| 5,922,378 A | 7/1999 | Kagan et al. |
| 5,922,803 A | 7/1999 | Koslow et al. |
| 5,928,503 A | 7/1999 | Shang-Chun |
| 5,928,506 A | 7/1999 | Bae |
| 5,928,558 A | 7/1999 | Cunkle et al. |
| 5,935,426 A | 8/1999 | Giordano et al. |
| 5,957,034 A | 9/1999 | Sham et al. |
| 5,957,339 A | 9/1999 | Deni et al. |
| 5,972,253 A | 10/1999 | Kimber |
| D416,307 S | 11/1999 | Williams |
| 5,976,363 A | 11/1999 | Monroe et al. |
| 5,989,425 A | 11/1999 | Yonezawa et al. |
| 5,989,736 A | 11/1999 | Lintz et al. |
| 5,990,041 A | 11/1999 | Chung et al. |
| 5,992,684 A | 11/1999 | Russell |
| D418,198 S | 12/1999 | Bainton |
| 5,997,734 A | 12/1999 | Koski et al. |
| 6,001,249 A | 12/1999 | Bailey et al. |
| 6,013,180 A | 1/2000 | Wang |
| D421,089 S | 2/2000 | Fujita et al. |
| 6,024,899 A | 2/2000 | Peng et al. |
| 6,030,698 A | 2/2000 | Burchell et al. |
| D422,679 S | 4/2000 | Burrows |
| 6,045,694 A | 4/2000 | Wang et al. |
| D424,660 S | 5/2000 | Teran et al. |
| 6,057,262 A | 5/2000 | Derbyshire et al. |
| D426,418 S | 6/2000 | Norvell et al. |
| 6,077,588 A | 6/2000 | Koslow et al. |
| D429,943 S | 8/2000 | Yu |
| 6,099,735 A | 8/2000 | Kelada |
| 6,103,114 A | 8/2000 | Tanner et al. |
| 6,120,682 A | 9/2000 | Cook |
| 6,120,683 A | 9/2000 | Reinhart et al. |
| 6,120,685 A | 9/2000 | Carlson et al. |
| 6,123,837 A | 9/2000 | Wadsworth et al. |
| 6,123,844 A | 9/2000 | Haney |
| 6,139,726 A | 10/2000 | Greene |
| 6,145,670 A | 11/2000 | Risser |
| 6,155,432 A | 12/2000 | Wilson et al. |
| 6,177,319 B1 | 1/2001 | Chen |
| D437,402 S | 2/2001 | Gieseke et al. |
| D437,913 S | 2/2001 | Adam et al. |
| D438,282 S | 2/2001 | Liu |
| D440,255 S | 4/2001 | Dickson |
| 6,214,224 B1 | 4/2001 | Farley |
| 6,228,255 B1 | 5/2001 | Peterson et al. |
| 6,228,803 B1 | 5/2001 | Gadkaree et al. |
| 6,241,893 B1 | 6/2001 | Levy |
| 6,241,899 B1 | 6/2001 | Ramos |
| 6,245,229 B1 | 6/2001 | Kool et al. |
| 6,258,265 B1 | 7/2001 | Jones |
| 6,258,266 B1 | 7/2001 | Riback et al. |
| 6,264,830 B1 | 7/2001 | Plester et al. |
| D446,840 S | 8/2001 | Strand |
| 6,270,658 B1 | 8/2001 | Plüss |
| 6,270,822 B1 | 8/2001 | Frazier |
| 6,274,041 B1 | 8/2001 | Williamson et al. |
| D449,758 S | 10/2001 | Norvell et al. |
| 6,303,031 B1 | 10/2001 | Senner |
| 6,328,881 B1 | 12/2001 | Larkner et al. |
| 6,337,015 B1 | 1/2002 | Poirier |
| D454,615 S | 3/2002 | Neal |
| 6,361,686 B1 | 3/2002 | Conrad |
| 6,370,884 B1 | 4/2002 | Kelada |
| 6,391,191 B2 | 5/2002 | Conrad |
| 6,402,949 B1 | 6/2002 | Banks |
| 6,423,212 B1 | 7/2002 | Bosko |
| 6,428,687 B1 | 8/2002 | Moretto |
| 6,428,708 B1 | 8/2002 | Halemba et al. |
| 6,436,282 B1 | 8/2002 | Gundrum et al. |
| D465,018 S | 10/2002 | Gustafsson et al. |
| D466,602 S | 12/2002 | Gieseke et al. |
| 6,491,811 B2 | 12/2002 | Conrad et al. |
| 6,491,815 B2 | 12/2002 | Conrad et al. |
| 6,565,749 B1 | 5/2003 | Hou et al. |
| 6,579,445 B2 | 6/2003 | Nachtman et al. |
| 6,630,016 B2 | 10/2003 | Koslow |
| 6,660,166 B2 | 12/2003 | Tremblay et al. |
| 6,827,854 B2 | 12/2004 | Mitchell et al. |
| 6,881,348 B2 | 4/2005 | Cannon et al. |
| 7,615,152 B2 * | 11/2009 | Tanner et al. ............ 210/257.1 |
| 2001/0032823 A1 | 10/2001 | Plester et al. |
| 2002/0011434 A1 | 1/2002 | Kuennen et al. |
| 2002/0014461 A1 | 2/2002 | Kuennen et al. |
| 2002/0033365 A1 | 3/2002 | Patil |
| 2002/0043491 A1 | 4/2002 | Janik et al. |
| 2002/0060177 A1 | 5/2002 | Conrad |
| 2002/0074294 A1 | 6/2002 | Tremblay et al. |
| 2002/0134714 A1 | 9/2002 | Ozeki et al. |
| 2002/0148785 A1 | 10/2002 | Mitchell et al. |
| 2002/0150686 A1 | 10/2002 | Mitchell et al. |
| 2002/0170618 A1 | 11/2002 | Pluta et al. |
| 2002/0170921 A1 | 11/2002 | Tan et al. |
| 2002/0172637 A1 | 11/2002 | Chesneau et al. |
| 2003/0038084 A1 | 2/2003 | Mitchell et al. |
| 2003/0096703 A1 | 5/2003 | Mitchell et al. |
| 2003/0106851 A1 | 6/2003 | Tremblay et al. |
| 2003/0136728 A1 | 7/2003 | Jagtoyen et al. |
| 2003/0217963 A1 | 11/2003 | Mitchell et al. |
| 2004/0040906 A1 | 3/2004 | Jagtoyen et al. |
| 2004/0129617 A1 | 7/2004 | Tanner et al. |
| 2004/0159596 A1 | 8/2004 | Mitchell et al. |
| 2004/0164018 A1 | 8/2004 | Mitchell et al. |
| 2004/0251190 A1 | 12/2004 | Cumberland |
| 2008/0093303 A1 | 4/2008 | Tremblay et al. |
| 2009/0008323 A1 | 1/2009 | Bahm |

FOREIGN PATENT DOCUMENTS

| | | |
|---|---|---|
| DE | 3020615 | 12/1980 |
| DE | 3511389 | 5/1985 |
| DE | 3738231 | 5/1989 |
| DE | 3914940 | 11/1990 |
| DE | 4028529 | 3/1992 |
| DE | 4116128 | 11/1992 |
| DE | 93 12 279 | 10/1993 |
| DE | 19650191 | 8/1998 |
| DE | 19717579 | 10/1998 |
| DE | 10016365 | 10/2001 |
| EP | 0 285 321 A2 | 3/1988 |
| EP | 0 364 111 A1 | 4/1990 |
| EP | 0 366 539 A2 | 5/1990 |
| EP | 367389 | 5/1990 |
| EP | 0 439 005 A1 | 7/1991 |
| EP | 0 490 317 | 6/1992 |
| EP | 0 551 864 A1 | 7/1993 |
| EP | 0563027 | 6/1994 |
| EP | 0616975 A2 | 9/1994 |
| EP | 0 792 676 A1 | 9/1997 |
| EP | 0 798 003 A2 | 10/1997 |
| EP | 0880986 A2 | 12/1998 |
| EP | 0947231 A1 | 10/1999 |
| EP | 0891952 | 6/2000 |
| EP | 1106228 | 6/2001 |
| EP | 0668243 B1 | 9/2001 |
| EP | 1 419 109 | 12/2005 |

| | | |
|---|---|---|
| FR | 2331 515 | 6/1977 |
| FR | 2557807 | 7/1985 |
| FR | 2743 285 | 7/1997 |
| FR | 2788511 | 7/2000 |
| GB | 191594 | 1/1923 |
| GB | 1163426 | 9/1969 |
| GB | 1202215 | 8/1970 |
| GB | 1470874 | 4/1977 |
| GB | 1546409 | 5/1979 |
| GB | 2 029 255 A | 3/1980 |
| GB | 2 051 770 A | 1/1981 |
| GB | 2238532 A | 6/1991 |
| GB | 2250281 A | 6/1992 |
| GB | 2 257 429 A | 1/1993 |
| GB | 2 311 775 A | 10/1997 |
| GB | 2311775 A | 10/1997 |
| JP | 58 131 187 A2 | 8/1983 |
| JP | 1 304 095 A | 12/1989 |
| JP | 04 247 233 A2 | 9/1992 |
| JP | 4-277080 | 10/1992 |
| JP | 05049921 | 3/1993 |
| JP | 05 253 478 A2 | 10/1993 |
| JP | 07 080 449 A2 | 3/1995 |
| JP | 08 099 080 A2 | 4/1996 |
| JP | 10 052 616 A2 | 2/1998 |
| JP | 10076254 | 3/1998 |
| JP | 10 139 645 A2 | 5/1998 |
| JP | 2000281445 | 10/2000 |
| RU | 2 034 789 | 5/1995 |
| RU | 2 064 429 | 7/1996 |
| RU | 2 070 438 | 12/1996 |
| SU | 1717538 | 3/1992 |
| WO | WO 88/07500 | 10/1988 |
| WO | WO 91/01786 | 2/1991 |
| WO | WO 93/12864 | 1/1992 |
| WO | WO 92/12784 | 8/1992 |
| WO | WO 93/17725 | 9/1993 |
| WO | WO 93/23336 | 11/1993 |
| WO | WO 94/10091 | 3/1994 |
| WO | WO 94/23827 | 10/1994 |
| WO | WO 95/05237 | 2/1995 |
| WO | WO 95/06507 A1 | 3/1995 |
| WO | WO 95/09129 | 4/1995 |
| WO | WO 95/24256 | 9/1995 |
| WO | WO 96/30309 | 10/1996 |
| WO | WO 96/30310 | 10/1996 |
| WO | WO 97/30938 | 8/1997 |
| WO | WO 97/34832 | 9/1997 |
| WO | WO 97/38941 A1 | 10/1997 |
| WO | WO 98/12489 | 3/1998 |
| WO | WO 98/43796 | 10/1998 |
| WO | WO 99/07456 | 2/1999 |
| WO | WO 99/10069 | 3/1999 |
| WO | WO 99/10076 | 3/1999 |
| WO | WO 99/47226 | 9/1999 |
| WO | WO 00/00266 | 1/2000 |
| WO | WO 00/00437 | 1/2000 |
| WO | WO 00/01624 | 1/2000 |
| WO | WO 00/01625 | 1/2000 |
| WO | WO 00/01626 | 1/2000 |
| WO | WO 00/25887 | 5/2000 |
| WO | WO 00/35559 A2 | 6/2000 |
| WO | WO 00/37363 | 6/2000 |
| WO | WO 00/37385 A1 | 6/2000 |
| WO | WO 00/43319 | 7/2000 |
| WO | WO 98/37950 | 9/2000 |
| WO | WO 01/12559 A1 | 2/2001 |
| WO | WO 01/44120 A2 | 6/2001 |
| WO | WO 01/174725 | 10/2001 |
| WO | WO 02/14228 A2 | 2/2002 |
| WO | WO 02/068324 | 9/2002 |
| WO | WO 02/083266 | 10/2002 |
| WO | WO 02/085794 | 10/2002 |
| WO | WO 02/098536 | 12/2002 |
| WO | WO 02/100509 | 12/2002 |
| WO | 03/022745 | 3/2003 |
| WO | WO 03/068686 | 8/2003 |
| WO | WO 2004/076361 A1 | 9/2004 |
| WO | 2006/008324 | 1/2006 |

OTHER PUBLICATIONS

Bautista—Toledo, I. et al., "Activated carbons as Adsorbents of Bacteria," Conference Proceedings for Eurocarbon 98, Strasbourg, France Jul. 5-9, 1998.

Burchell, T.D., et al., "The effect of Neutron Irradiation on the Structure and Properties of Carbon-Carbon Composite Materials," Effects of Ratioation on Materials: 16th International Symposium, ASTM STP 1175, American Society for Testing and Materials, Philadelphia, 1993.

Ceramikx:All—Carbon, Sub-Micron Performance; http://www.kxindustries.com; pp. 1-2, 2005, KX Industries, L.P.

Cuno, Process Filtration Products, Product Information, Zeta Plus Virosorb® 1MDS, pp. 2 (1989).

Daniels, S. S., "The Adsorption of Microorganisms onto Solid Surfaces: A Review," Developments in Industrial Microbiology, pp. 211-243, Aug. 29-Sep. 4, 1971.

Derbyshire< F., et al., "Carbon Fiber Composite Molecular Sieves for Gas Separation," Eighth CIMTEC, Florence, Italy, Jun. 28-Jul. 2, 1994.

Dorfner, K., "2.1—Synthetic Resin Ion Exchangers," Ion Exchangers Properties and Applications, Cover page and pp. 16-35 (1972).

Evans, M. J. B., et al., "The Production of Chemically-Activated Carbon," Carbon, vol. 37, pp. 269-274 (1999).

Gerba, C.P., "Applied and Theortetical Aspects of Virus Adsorption to Surfaces," Advances in Applied Microbiology, vol. 30, pp. 133-168 (Copyright© 1984).

Gerba, C.P., et al., "Removal of Poliovirus and Rotavirus from Tapwater by a Quaternary Ammonium Resin," Water Res., vol. 18, No. 1, pp. 17-19 (1984).

Goyal, S. M., et al., "Concentration of Bacteriophage Lysates by Filter Chromatography," Journal of Virological Methods, vol. 1, pp. 79-85 (1980).

Goyal, S.M., "Simple Method for Concentration of Bacteria from Large Volumes of Tap Water," Applied and Environmental Microbiology, vol. 40, No. 5, pp. 912-916 (Nov. 1980).

Hercules Product Data, Polycup® Resins and Kymene® 2064, Hercules Incorporated, Wilmington, DE 10 pages (date unkown).

Hercules Product Information, Hercules MSDS—Kymene 450 wet strength resin, 20 pages (Jan. 29, 1998).

Hill, Jr., W.F., et al., "Detection of Viruses in Water: Sensitivity of the Tentative Standard Method for Drinking Water," Applied and Environmental Microbiology, vol. 31, No. 2, pp. 254-261 (Feb. 1976).

Hou, K. et al., "Capture of Latex Beads, Bacteria, Endotoxin, and Viruses by Charge Modified Filters," Applied and Environmental Microbiology, vol. 40, No. 5, pp. 892-896 (Nov. 1980).

Hurst, C. J., et al., "Differential Effects of Tretrazolium Dyes upon Bacteriophage Plaque Assay Titers," Applied and Environmental Microbiology, vol. 60, No. 9, pp. 3462-3465 (Sep. 1994).

Isbister, J.D., et al., "Increasing ARCAT® Test Sensitivity for Examination of Potable Waters," Project Summary, United States Environmental Protection Agency, Research and Development 3 pgs. (May 1982).

Jagtoyen, M. et al., "Novel Activated Carbon Materials for Water Treatment," The European Carbon Conference "Carbon 96", Newcastle, UK Jul. 1996.

Jagtoyen, M. et al., "Activated carbons from yellow poplar and white oak by $H_3PO_4$ activation," Carbon, vol. 36, No. 7-8, pp. 1085-1097 (1998).

Jasra, R.V., et al., "Separation of Gases by Pressure Swing Adsorption," Separation Science and Technologoy, vol. 26, No. 7, pp. 885-930 (1991).

Kaneko, K., et al., "Microporosity and Adsorption Characteristics Against NO, $SO_2$ and $NH_3$ of Pitch Based Activated Carbon Fibers," Carbon, vol. 26, No. 3, pp. 327-332 (1988).

Kimber, G.M., et al., "Fabrication of Carbon Fibre Composites for Gas Separation," Gas. Sep. Purif., vol. 10, No. 2, pp. 131-136 (1996).

Kxindustries, L. P. Technical Data: Ceramikx; http://www.kxindustries.com/matrikx/ceramiks.htm; pp. 1-3, 2002: KX Industries L.P.

LeChevallier, M.W., et al., "Disinfection of Bacteria Attached to Granular Activated Carbon," Applied and Environmental Microbiology, vol. 48, No. 5, pp. 918-923 (1984).

Ma, J., et al., "Evaluation of MK Filters for Recovery of Enteroviruses from Tap Water," Applied and Environmental Microbiology, vol. 60, No. 6, pp. 1974-1977 (Jun. 1994).

Moore, R.S., et al., "Improved Methods for Poliovirus Recovery from Water with Electropositive Adsorbent Filters," Annu. Meet. Am. Soc. Microbiol., paper Q55, 14 pages (1982).

Nupen, E.M., et al., "The Recovery of Viruses from Drinking—Water by Means of an In-Line Electropositive Cartridge Filter," National Institute for Water Research, Council for Scientific and Industrial Research, pp. 1-7 (date unknown).

Openko, N., et al., "Application of Carbon Materials in Water Purification," Conference Proceedings for Eurocarbon '98, Strasbourg, France Jul. 5-9, 1998.

Powell, T., et al., "Investigating the Effect of Carbon Shape on Virusa Adsorption," Environmental Science and Technology, vol. 34, No. 11, pp. 2779-2783 (2000).

Powell, T.M., et al., "Comparative Adsorption of a Model Bacteriophage by Activated Carbon," University of Kentucky Dept. of Civil Engineering and Center for Applied Energy Research, pp. 685-690.

Preston, D.R., et al., "Removal of Viruses from Tapwater by Fiberglass Filters Modified with a Combination of Cationic Polymers," Wat. Sci. Tech.,. vol. 21, No. 3, pp. 93-98 (1989).

Ryoo, R., et al., "Synthesis of Highly Ordered Carbon Molecular Sieves via Template—Mediated Structural Transformation," The Journal ofo Physical Chemistry B, vol. 103, Nu. 37, pp. 7743-7746 (1999).

Ryu, S.K., "Porosity of Activated Carbon Fibre," High Temperatures—High Pressures, vol. 22, pp. 345-354 (1990.

Sakoda, a., et al., "Adsorption of Viruses in Water Environment onto Solid Surfaces," Wat. Sci. Tech., vol. 35, No. 7, pp. 107-114 (1997).

Sobsey, M.D., et al., "Improved Electopositive Filters for Concentrating Viruses from Large Volumes of Water," Presents at the International Symposium on Viruses and Wastewater Treatment, pp. 107 (Sep. 15-17, 1980).

Sobsey, M.D., et al., "Concentration of Poliovirus from Tap Water Using Positively Charged Microporous Filgers," Applied and Environmental Microbiology, vol. 37, No. 3, pp. 588-595 (Mar. 1979).

Sobsey, M.D., et al., "Evaluating Adsorbent Filter Performance for Enteric Virus Concentrations in Tap Water," Research and Technology, pp. 542-548 (Oct. 1981).

United States Environmental Protection Agency, Office of Research and Development, "Stormwater Treaatment at Critical Areas: Evaluation of Filtration Methods," EPA/600/R-00/010, pp. 14, Oct. 1999.

Vaughn, J.M., et al., "Chapter 10: Virus Inactivation by Disinfectants," IV Disinfecction, pp. 217-241 (date unknown).

Wei, G.C., et al., "Carbon-Bonded Carbon Fiber Insulation for Radioisotope Space Power Systems," Ceramic Bulletin, vol. 64, No. 5, pp. 691-699 (1985).

Westvaco Products On-Line, "Wood-based Activated Carbons", (2 pgs.), downloaded Jul. 2001.

World Health Organization—Geneva, 1996 "Chapter 2—Microbiolgical Aspects: Introducction," Guidelines for drinking—water quality, Second edition, vol. 2, Health Criteria and other supporting information, cover page and pp. 9-12.

Zerda, K.S., et al., "Adsorption of Viruses to Charge—Modified Silica," Applied and Environmental Microbiolgoy, vol. 49, No. 1, pp. 91-95 (Jan. 1985).

http://www.waterfilters.net/KX-Matrix-20-185-125-083-cermikx-SC-Water-Filter_p_12... "KX Matrikx Ceramikx SC 20-185-125-083 Water Filter", Mar. 11, 2008.

U.S. Appl. No. 09/574,456, filed May 19, 2000, Tremblay et al.

Dimitris Ioannis Collias, Declaration under 37 CFR §1.132, Apr. 1, 2004.

Newcombe, G., et al., "Granular activated Carbon: importance of surface properties in the adsorption of naturally occurring organics", *Colloids and Surfaces A: Physiochemical and Engineering Aspects*, 1993, 65-71, vol. 78.

Gregg, S.J., et al., "Mesoporous solids: the Type IV isotherm", *Adsorption, Surface Area and Porosity*, 1982, 137-143, 2nd Edition, Academic Press, Inc.

Report of Task Force, "Guide Standard and Protocol for Testing Microbiological Water Purifiers", *United States Environmental Protection Agency*, (submitted Apr. 1986), revised Apr. 1987, 1-39.

Westvaco Products On-Line, "Wood-based Activated Carbons", (2 pgs), downloaded Jul. 2001.

Abotsi, Godried, "Interfacial Properties of Coal: A Guide to Catalyst Loading and Dispersion for Coal Conversion", *Energia*, vol. 7, No. 5, 3-5, (1996).

Moreno-Castilla, C., et al., "The Creation of Acid Carbon Surfaces by Treatment with $(NH_4)_2S_2O_8$", *Carbon*, vol. 35, No. 10-11, 1619-1626 (1997).

Franz, M., et al., "Effect of Chemical Surface Heterogeneity on the Adsorption Mechanism of Dissolved Aromatics on Activated Carbon", *Carbon*, vol. 28, No. 13, 1807-1819, (2000).

Babic, B.M., et al., "Point of Zero Charge and Intrinsic Equilibrium Constants of Activated Carbon Cloth", *Carbon*, vol. 37, No. 3, 477-481, (Feb. 22, 1999).

Menendez, J.A., et al., "On the Difference Between the Isoelectric Point and the Point of Zero Charge of Carbons", *Carbon*, vol. 33, No. 11, 1655-1657, (1995).

USPTO Notice of Allowance mailed Apr. 22, 2010 in reference to co-pending U.S. Appl. No. 12/465,216, filed May 13, 2009.

USPTO Notice of Allowance mailed Apr. 20, 2010 in reference to co-pending U.S. Appl. No. 12/465,238, filed May 13, 2009.

USPTO Notice of Allowance mailed Apr. 16, 2010 in reference to co-pending U.S. Appl. No. 12/465,193, filed May 13, 2009.

USPTO Non-Final Rejection mailed Dec. 17, 2009 in reference to co-pending U.S. Appl. No. 12/465,216, filed May 13, 2009.

USPTO Non-Final Rejection mailed Dec. 15, 2009 in reference to co-pending U.S. Appl. No. 12/465,238, filed May 13, 2009.

USPTO Non-Final Rejection mailed Dec. 15, 2009 in reference to co-pending U.S. Appl. No. 12/465,193, filed May 13, 2009.

USPTO Non-Final Rejection mailed Dec. 30, 2009 in reference to co-pending U.S. Appl. No. 12/501,216, filed Jul. 10, 2009.

* cited by examiner

WATER TREATING METHODS

CROSS REFERENCE TO RELATED APPLICATIONS

Pursuant to 35 U.S.C. §120, this application is a divisional of U.S. application Ser. No. 10/643,669, filed on Aug. 19, 2003, now U.S. Pat. No. 7,615,152, the substance of which is incorporated herein by reference. U.S. application Ser. No. 10/643,669 is a continuation-in-part of U.S. application Ser. No. 10/464,209, which was filed on Jun. 18, 2003, now abandoned, the substance of which is incorporated herein by reference. U.S. application Ser. No. 10/643,669 is also a continuation-in-part of U.S. application Ser. No. 10/464,210, which was filed on Jun. 18, 2003, now U.S. Pat. No. 7,614,506, the substance of which is incorporated herein by reference. U.S. application Ser. Nos. 10/464,209 and 10/464,210 are both continuations of International application Nos. PCT/US03/05416 and PCT/US03/05409, both of which designate the U.S., both of which were filed Feb. 21, 2003, the substances of which are incorporated herein by reference. Additionally, U.S. application Ser. Nos. 10/464,209 and 10/464,210 are both continuation-in-parts of U.S. application Ser. Nos. 09/935,962, and 09/935,810, both of which were filed on Aug. 23, 2001, both now abandoned, the substances of which are incorporated herein by reference.

FIELD OF THE INVENTION

A method of treating untreated drinking water with a water treatment device.

BACKGROUND OF THE INVENTION

Water may contain many different kinds of contaminants including, for example, particulates, harmful chemicals, and microbiological organisms, such as bacteria, parasites, protozoa, and viruses. In a variety of circumstances, at least some of these contaminants should be removed before the water can be deemed potable, i.e., fit to consume as drinking water.

In non-developed countries, there are deadly consequences associated with exposure to contaminated water. At the same time, there are several factors that contribute to contaminated water, including: increasing population densities, increasingly scarce water resources, no water filter utilities, and often, no electricity (including the batteries which are too expensive). In some instances, homes that are next to one another in the same geography may have large variances in the pressure of untreated drinking water available to them. Also, it is common for sources of drinking water to be in close proximity to human and animal waste, such that microbiological contamination is a major health concern. As a result of waterborne microbiological contamination, an estimated six million people die each year, half of which are children under 5 years of age.

In 1987, the U.S. Environmental Protection Agency (EPA) introduced the "*Guide Standard and Protocol for Testing Microbiological Water Purifiers*". The protocol establishes minimum requirements regarding the performance of drinking water filter devices that are designed to reduce specific health related contaminants in public or private water supplies. The requirements are that the effluent from a water supply source exhibits 99.99% (or equivalently, 4 log) removal of viruses and 99.9999% (or equivalently, 6 log) removal of bacteria against a challenge. Under the EPA protocol, in the case of viruses, the influent concentration should be $1 \times 10^7$ viruses per liter, and in the case of bacteria, the influent concentration should be $1 \times 10^8$ bacteria per liter. Because of the prevalence of *Escherichia coli* (*E. coli*, bacterium) in water supplies, and the risks associated with its consumption, this microorganism is used as the bacterium in the majority of studies. Similarly, the MS-2 bacteriophage (or simply, MS-2 phage) is typically used as the representative microorganism for virus removal because its size and shape (i.e., about 26 nm and icosahedral) are similar to many viruses. Thus, a filter's ability to remove MS-2 bacteriophage demonstrates its ability to remove other viruses.

Thus, water filter devices that can provide the average household with an adequate daily supply of potable water for drinking and cooking when untreated drinking water is contaminated with viruses and bacteria, water is scarce, electricity and batteries are not available, when there are great variances in water pressure within common geographies and when there are periods of little to no water pressure, is of continued interest.

SUMMARY

One embodiment of a method of treating low-pressure untreated drinking water includes providing a low-pressure water filter device, running low-pressure untreated drinking water from a source of low-pressure untreated drinking water through a low-pressure water filter of the low-pressure water filter device, removing bacteria and viruses from the low pressure untreated drinking water at a level of Filter Bacteria Log Removal of greater than about 2 logs and a Filter Viruses Log Removal of greater than about 1 log, and filling a storage housing with treated drinking water at greater than about 5 mL/min. The low-pressure water filter device may include a connector for connecting to an untreated drinking water source, a low-pressure water filter comprising mesoporous activated carbon particles, and a storage housing. The average fluid contact time with the low-pressure water filter may be greater than about 2 seconds.

Another embodiment of a method of treating low-pressure untreated drinking water includes providing a low-pressure water filter device, passing low-pressure untreated drinking water from a source of low-pressure untreated drinking water through a low-pressure water filter of the low-pressure water filter device such that the average fluid contact time is greater than about 2 seconds, removing bacteria and viruses from the low pressure untreated drinking water at a level of Filter Bacteria Log Removal of greater than about 2 logs and a Filter Viruses Log Removal of greater than about 1 log, filling a storage housing with treated drinking water at greater than about 5 mL/min but not greater than about 2,000 mL/min until activating an automatic shutoff valve, and arresting the flow of said treated drinking water when the automatic shutoff valve is activated. The low-pressure water filter device may include a connector, a low-pressure water filter comprising filter particles consisting of mesoporous activated carbon, a storage housing, an automatic shutoff valve, and a dispenser. A sum of mesopore and macropore volumes of said filter particles may be between about 0.2 mL/g and about 2 mL/g, wherein mesopore means an intra-particle pore having a diameter between 2 nm and 50 nm, and macropore means an intra-particle pore having a diameter greater than 50 nm, a total pore volume of said filter particles is greater than about 0.4 mL/g and less than about 3 mL/g, and a ratio of the sum of mesopore and macropore volumes to the total pore volume of said filter particles is greater than about 0.3. The water filter device may be a non-electric water filter device, and operable to remove microorganisms from said untreated drinking water.

BRIEF DESCRIPTION OF THE DRAWINGS

FIG. 2-B is a perspective view of a connector of the water filter device of FIG. 1 in the "closed position", and a partial view of a connector hose of the water filter device of FIG. 1;

FIG. 5-A is an enlarged view of the flow regulator of FIG. 5;

DETAILED DESCRIPTION

I. Definitions

Figure 1:
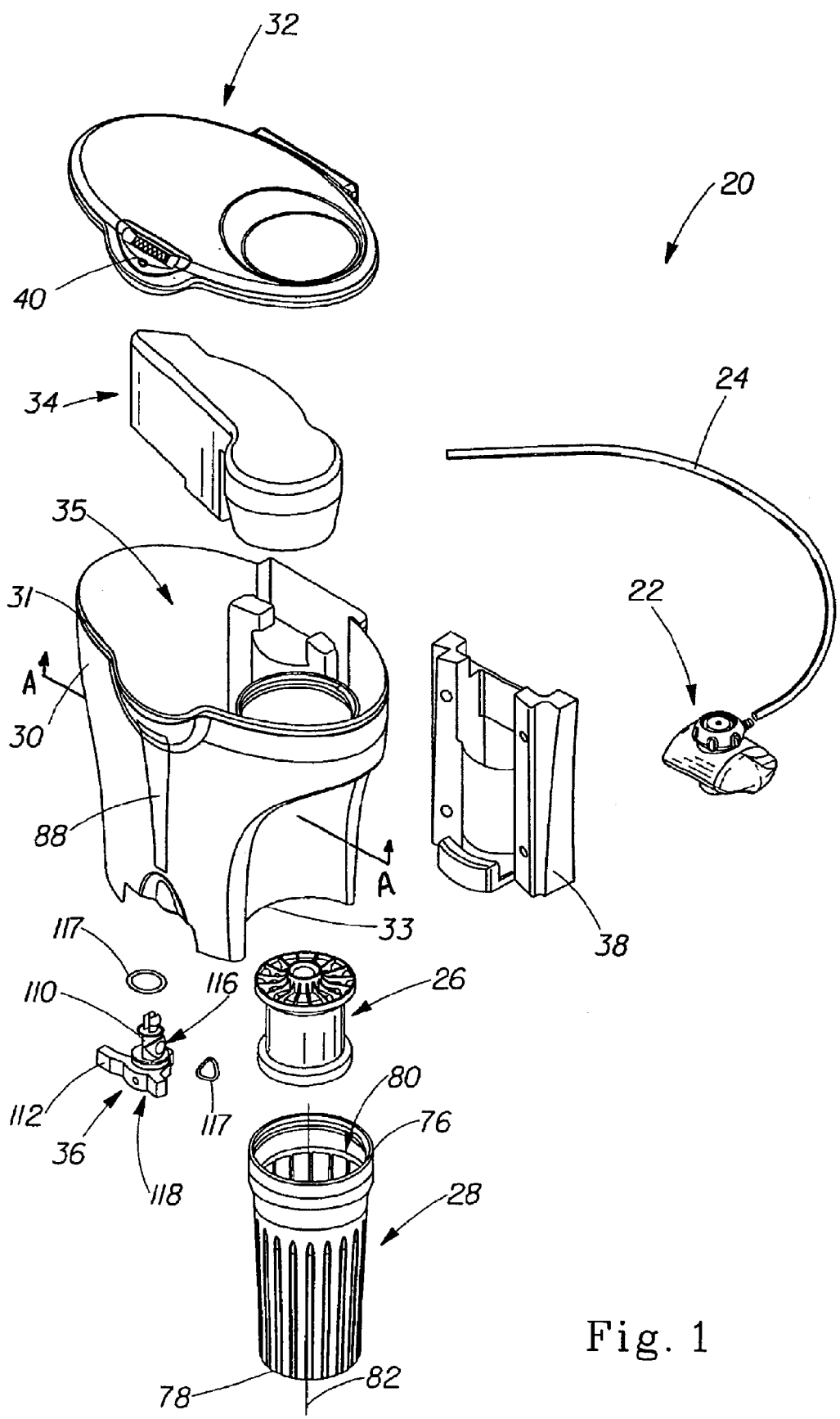
FIG. 1 is an exploded perspective view of a water filter device.

As used herein, the term "activation" and its derivatives are intended to refer to a process in which a carbonized substance is rendered more porous.

As used herein, the term "activated carbon particles" or "activated carbon filter particles" and their derivatives are intended to refer to carbon particles that have been subjected to an activation process, i.e., a process in which a carbonized substance is rendered more porous.

As used herein, the phrases "average fluid residence time" and/or "average fluid contact time" refer to the average time that the fluid is in contact with the filter particles inside the filter as it travels through the filter material, and are calculated as the ratio of the filter material pore volume to the fluid flow rate.

As used herein, the phrase "axial flow" refers to flow through a planar surface and perpendicularly to that surface.

As used herein, the term "basic" is intended to refer to filter particles with a point of zero charge greater than 7.

As used herein, the term "disposable" means a filter designed and manufactured for treating of from about 50 to about 200 gallons of untreated drinking water, or treating from about 30 days to about 120 days.

As used herein, the phrase "face area" refers to the area of the filter material initially exposed to the influent water. For example, in the case of axial flow filters, the face area is the cross sectional area of the filter material at the entrance of the fluid, and in the case of the radial flow filter, the face area is the outside area of the filter material.

As used herein, the phrase "Filter Bacteria Log Removal (F-BLR)" refers to the bacteria removal capability of the filter after the flow of the first 2,000 filter material pore volumes. The F-BLR is defined and calculated as:

$$F\text{-}BLR = -\log[(\text{effluent concentration of } E.\ coli)/(\text{influent concentration of } E.\ coli)],$$

where the "influent concentration of $E.\ coli$" is set to about $1\times10^8$ CFU/L continuously throughout the test and the "effluent concentration of $E.\ coli$" is measured after about 2,000 filter material pore volumes flow through the filter. F-BLR has units of "log" (where "log" is the logarithm). Note that if the effluent concentration is below the limit of detection of the technique used to assay, then the effluent concentration for the calculation of the F-BLR is considered to be the limit of detection. Also, note that the F-BLR is measured without application of chemical agents that provide bactericidal effects.

As used herein, the phrase "filter material depth" refers to the linear distance that the influent water travels from the entrance to the exit of the filter material. For example, in the case of axial flow filters, the filter depth is the thickness of the filter material, and in the case of the radial flow filter, the filter depth is half of the difference between the outside and inside diameters of the filter material.

As used herein, the phrase "filter material pore volume" refers to the total volume of the inter-particle pores in the filter material with sizes larger than 0.1 µm.

As used herein, the phrase "filter material total volume" refers to the sum of the inter-particle pore volume and the volume occupied by the filter particles.

As used herein, the phrase "filter particle" is intended to refer to an individual member or piece, which is used to form at least part of a filter material. For example, a fiber, a granule, a bead, etc. are each considered filter particles herein.

As used herein, the phrases "filter porosity" and/or "filter bed porosity" refer to the ratio of the filter material pore volume to the filter material total volume.

As used herein, the phrase "Filter Viruses Log Removal (F-VLR)" refers to the virus removal capability of the filter after the flow of the first 2,000 filter material pore volumes. The F-VLR is defined and calculated as:

$$F\text{-}VLR = -\log[(\text{effluent concentration of } MS\text{-}2)/(\text{influent concentration of } MS\text{-}2)],$$

where the "influent concentration of MS-2" is set to about $1\times10^7$ PFU/L continuously throughout the test and the "effluent concentration of MS-2" is measured after about 2,000 filter material pore volumes flow through the filter. F-VLR has units of "log" (where "log" is the logarithm). Note that if the effluent concentration is below the limit of detection of the technique used to assay, then the effluent concentration for the calculation of the F-VLR is considered to be the limit of detection. Also, note that the F-VLR is measured without application of chemical agents that provide virucidal effects.

As used herein, the term "low-pressure" means from about 1 pound per square inch (herein, "psi") to about 20 psi.

As used herein, the term "low-pressure water filter" means a water filter which delivers from about 5 milliliters/minute (herein "mL/min") to about 400 mL/min of treated drinking water when the source of untreated drinking water is at a pressure of at least about 1 psi.

As used herein, the term "macropore" is intended to refer to an intra-particle pore having a width or diameter greater than 50 nm (or equivalently, 500 Å).

As used herein, the term "mesopore" is intended to refer to an intra-particle pore having a width or diameter between 2 nm and 50 nm (or equivalently, between 20 Å and 500 Å).

As used herein, the term "low-pressure water filter device" means a water filter device that delivers at least about 5 mL/min to about 400 mL/min of treated drinking water when the source untreated drinking water is at a pressure of at least about 1 psi.

As used herein, the phrase "mesoporous activated carbon filter particle" refers to an activated carbon filter particle wherein the sum of the mesopore and macropore volumes may be greater than 0.12 milliliters/gram (herein "mL/g").

As used herein, the phrase "mesoporous and basic activated carbon filter particle" is intended to refer to an activated carbon filter particle wherein the sum of the mesopore and macropore volumes may be greater than 0.12 mL/g and has a point of zero charge greater than 7.

As used herein, the phrase "mesoporous, basic, and reduced-oxygen activated carbon filter particle" is intended to refer to an activated carbon filter particle wherein the sum of the mesopore and macropore volumes may be greater than 0.12 mL/g, has a point of zero charge greater than 7, and has a bulk oxygen percentage by weight of 1.5% or less.

As used herein, the terms "microorganism", "microbiological organism" and "pathogen" are used interchangeably. These terms refer to various types of microorganisms that can be characterized as bacteria, viruses, parasites, protozoa, and germs.

As used herein, the term "micropore" is intended to refer to an intra-particle pore having a width or diameter less than 2 nm (or equivalently, 20 Å).

As used herein, the phrase "micropore volume" and its derivatives are intended to refer to the volume of all micropores. The micropore volume is calculated from the volume of nitrogen adsorbed at a relative pressure of 0.15 using the Brunauer, Emmett and Teller (herein "BET") process (ASTM D 4820-99 standard), a process well known in the art.

As used herein, the term "non-electric water filter device" means a water filter device that does not use alternating or direct current to increase water pressure.

As used herein, the phrase "point of zero charge" is intended to refer to the pH above which the total surface of the carbon particles is negatively charged. A well known test procedure for determining the point of zero charge is set forth hereafter.

As used herein, the phrase "pore size distribution in the mesopore range" is intended to refer to the distribution of the pore size as calculated by the Barrett, Joyner, and Halenda (BJH) process, a process well known in the art.

As used herein, the phrase "radial flow" typically refers to flow through essentially cylindrical or essentially conical surfaces and perpendicularly to those surfaces.

As used herein, the phrase "sum of the mesopore and macropore volumes" and its derivatives are intended to refer to the volume of all mesopores and macropores. The sum of the mesopore and macropore volumes is equal to the difference between the total pore volume and micropore volume, or equivalently, is calculated from the difference between the volumes of nitrogen adsorbed at relative pressures of 0.9814 and 0.15 using the BET process (ASTM D 4820-99 standard), a process well known in the art.

As used herein, the term "self-filling" means a water filter device that stops treating untreated drinking water automatically once a storage housing is filled to a predetermined level.

As used herein, the phrase "specific external surface area" is intended to refer to the total external surface area per unit mass of the filter particles, as discussed more fully hereafter.

As used herein, the phrase "total external surface area" is intended to refer to the total geometric external surface area of one or more of the filter particles, as discussed more fully hereafter.

As used herein, the term "untreated" means water that has not been treated using the water filter device described herein.

As used herein, the term "water filter" or "filter" refers to structures and mechanisms, respectively for removal or neutralization of contaminants by, for example, one or a combination of size exclusion, electrolysis, absorption, adsorption, oxidation, reduction, chemical disinfection, ion exchange, etc.

As used herein, the phrase "water filter material" or "filter material" is intended to refer to an aggregate of filter particles. The aggregate of the filter particles forming a filter material can be either homogeneous or heterogeneous. The filter particles can be uniformly or non-uniformly distributed (e.g., layers of different filter particles) within the filter material. The filter particles forming a filter material also need not be identical in shape or size and may be provided in either a loose or interconnected form.

II. Water Filter Device

Numerals with the same last three digits represent the same or similar elements throughout the figures (e.g., 122, 1122, 2122, or 020, 1020, 2020).

As shown in FIG. 1, an embodiment of the invention may be a water filter device 20 that may comprise a connector 22 for connecting to an untreated drinking water source, a connector hose 24 for placing the connector 22 and the control head 34 in fluid communication, a water filter 26 for treating untreated drinking water, a filter vessel 28 for containing the water filter 26, a storage housing 30 for storing treated drinking water treated by the water filter 26, a storage housing cover 32 for covering the storage housing 30, a dispenser 36 for dispensing the treated drinking water stored in the storage housing 30, a wall-mount bracket 38 for mounting the water filter device 20, a flow regulator 39 (shown in FIG. 5) for controlling the flow of drinking water through the water filter device 20, and/or a life display 40 for displaying the life of the water filter 26.

A. The Hose

As shown in FIG. 1, the connector hose 24 may fluidly connect the connector 22 to the control head 34. The connector hose 24 may be various lengths and diameters. The connector hose 24 may be made from one or more of a variety of materials, including, but not limited to, one or a combination of plastics, etc.

B. The Connector

Figure 2A:
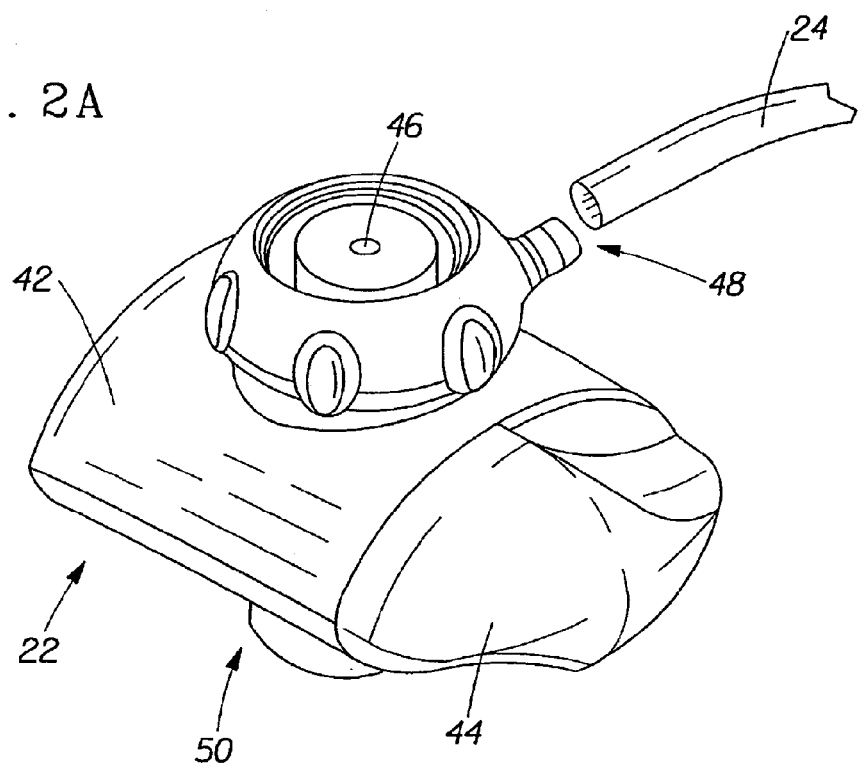
FIG. 2-A is a perspective view of the connector of the water filter device of FIG. 1 in the "open position", and a partial view of a connector hose of the water filter device of FIG. 1.
Figure 2B:
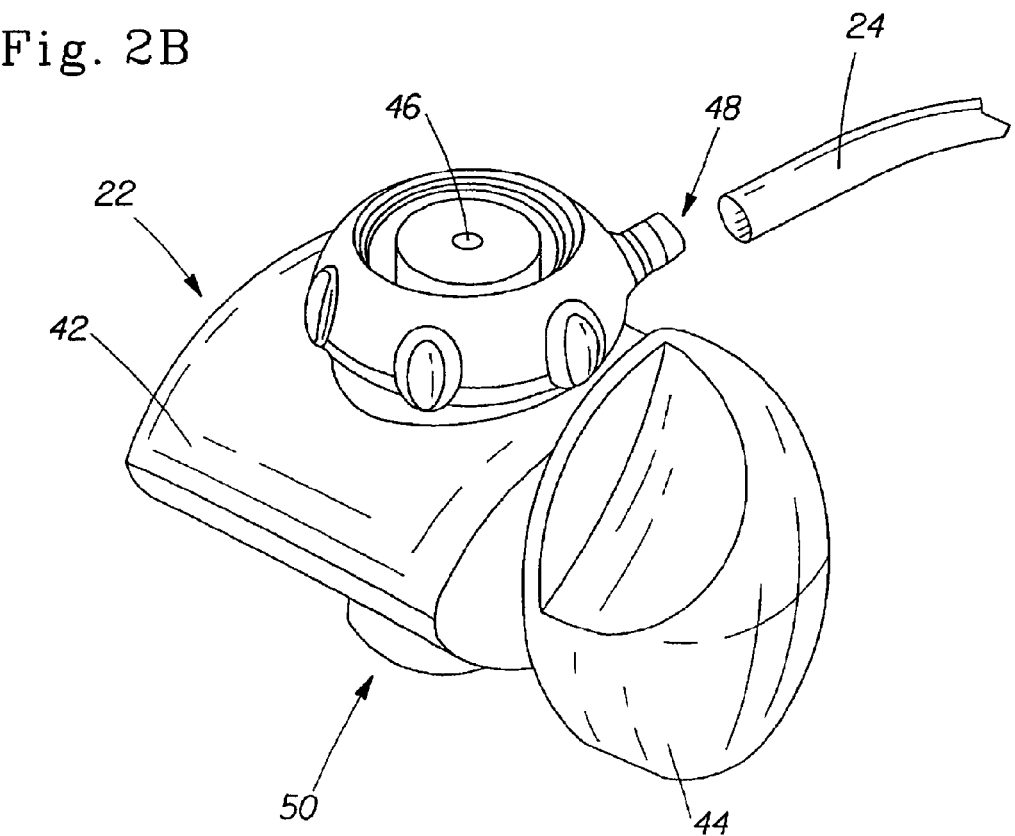

As shown in FIGS. 2-A and 2-B, the connector 22 may comprise a connector body 42, a connector handle 44, a valve, a connector inlet 46, a first connector outlet 48, and a second connector outlet 50. The connector inlet 46 may be releasably (e.g., friction fitted, threadably fitted, bolted, screwed, fastened, snap fitted, latched, etc.) or permanently (e.g., molded, adhesively bonded, soldered, welded, hot plate welded, etc.) connected to an untreated drinking water source (e.g., a residential-type water faucet, in-line under a sink, a roof-mounted tank, etc.) for introducing untreated drinking water into the water filter device 20. The first connector outlet 48 may be connected to the connector hose 24. The second connector outlet 50 may also be threaded for attachment of an aerator, a quick disconnect fitting for a dishwasher, etc. The connector handle 44 may be used to direct (by turning it 90 degrees) the flow of untreated drinking water, such that the user may choose between the immediate use of untreated drinking water through the second connector outlet 50 (the "open position" shown in FIG. 2-A), or treating untreated drinking water through the first connector outlet 48 (the "closed position" shown in FIG. 2-B). The connector 22 may be made from one or more of a variety of materials, including, but not limited to, one or a combination of plastics, metal and alloys thereof, fiberglass, etc.

C. The Water Filter

Figure 3:
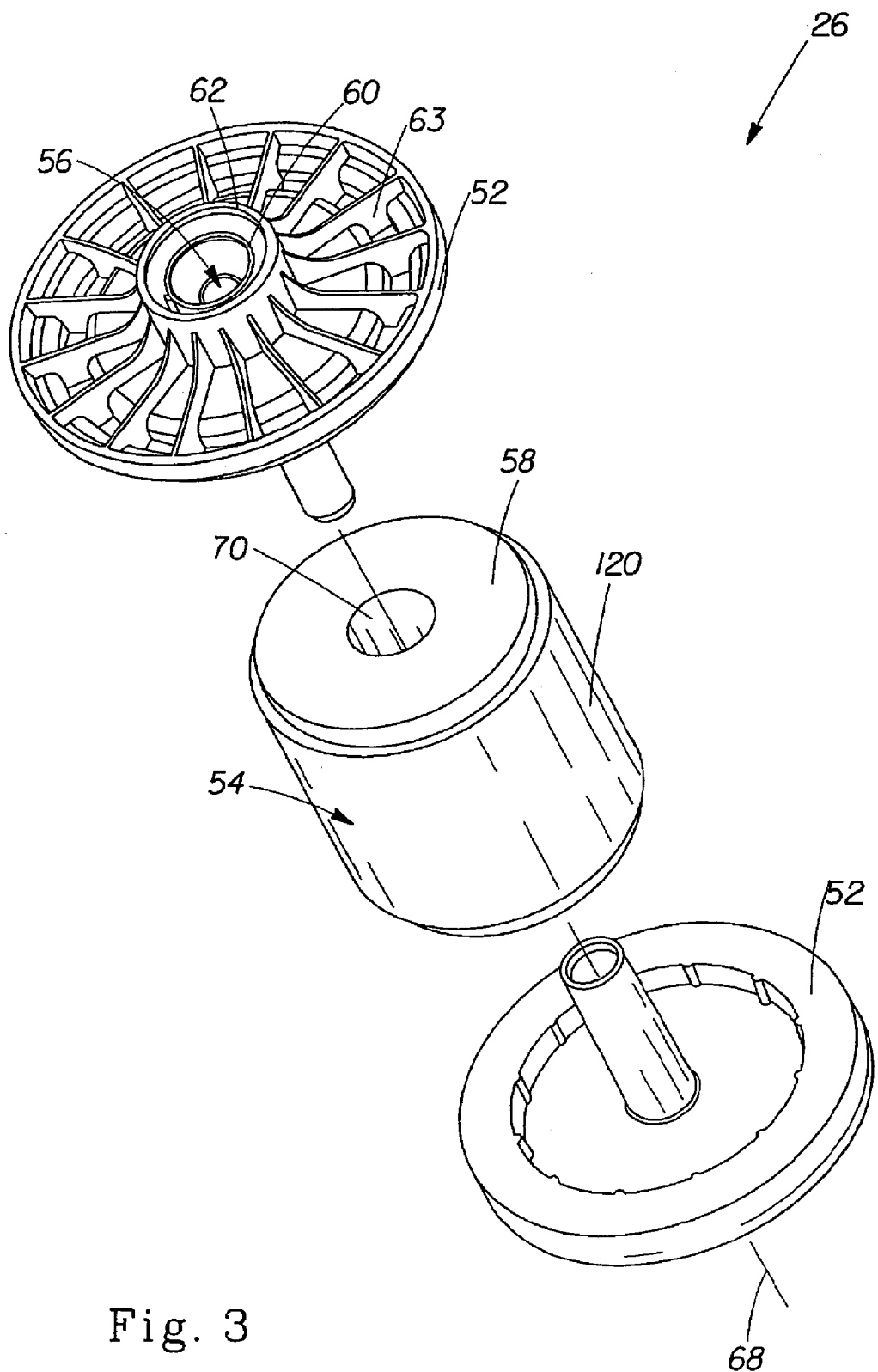
FIG. 3 is an exploded perspective view of the water filter of the water filter device of FIG. 1.

As shown in FIG. 3, the water filter 26 may comprise a filter housing 52, a filter inlet 54, a filter outlet 56, and a water filter material 58. Further, as described in U.S. Patent App. No. 60/473,271, the water filter 26 may have a first tube 60, second tube 62 (which may be supported by ribs 63), and third tube 64 (explained in more detail below, See FIG. 6).

The filter housing 52 may cap the end portions of the water filter material 58. The filter housing 52 may be cylindrical, however, it may be various shapes and sizes. The filter housing 52 may be made from one or more of a variety of materials, including, but not limited to, one or a combination of plastics, metal and alloys thereof, fiberglass, etc. Alternatively, the filter housing 52 may form a well-defined compartment that holds a water filter material 58.

The filter inlet 54 may be a portion of exposed water filter material 58 (e.g., a portion of a carbon block), or a pre-filter 120, capped by the filter housing 52 at both ends. That is, water may enter the water filter 26 through the exposed portion of the water filter material 58 or the pre-filter 120.

The filter outlet 56 may be a circular opening, concentric and coaxial with the longitudinal axis 68 of the water filter 26. The filter inlet 54 and filter outlet 56 may be of varying size and oriented in any manner that best serves the application. Thus, the filter inlet 54 and filter outlet 56 can be oriented in the same proximity (e.g., sharing the same opening), in near proximity (e.g., sharing the same surface or end), or in distant proximities from one another (e.g., located at opposite ends).

The water filter material 58 may be contained within the filter housing 52. The water filter material 58 may be in the form of a block, wherein the block of water filter material 58 may have a core region 70.

Examples of the water filter material 58 are described in U.S. Pat. Nos. 2,167,225, 2,335,458, 4,172,796, 4,493,772, 4,764,274, 4,025,438, 4,094,779, 5,679,248, 6,274,041, 6,337,015, and U.S. patent application Ser. Nos. 09/935,810, 09/935,962, 09/628,632, 09/832,581, 09/832,580, 09/736,749, 09/574,456, 09/564,919, and 09/347,223. For example, the water filter material may include, but is not limited to, one or a combination of carbon (e.g., activated carbon, including basic mesoporous wood activated carbon, such as a tube of porous carbon, or a block of porous carbon, or carbon powder or particles sintered with a plastic binder or the like), ion exchange material (e.g., in the form of resin beads, flat filtration membranes, fibrous filtration structures, etc.), zeolite particles or coatings (e.g., silver loaded), polyethylene, or charge-modified melt-blown or micro-fiber glass webs, alumina, diatomaceous earth, etc.

In regard to embodiments of the filter material, the sum of the mesopore and macropore volumes of the filter particles may be greater than about 0.12 mL/g, or greater than about 0.2 mL/g, or greater than about 0.4 mL/g, or greater than about 0.6 mL/g, or greater than about 0.75 mL/g, and/or less than about 2.2 mL/g, or less than about 2 mL/g, or less than about 1.5 mL/g, or less than about 1.2 mL/g, or less than about 1 mL/g. The total pore volume of the filter particles may be greater than about 0.4 mL/g, or greater than about 0.7 mL/g, or greater than about 1.3 mL/g, or greater than about 2 mL/g, and/or less than about 3 mL/g, or less than about 2.6 mL/g, or less than about 2 mL/g, or less than about 1.5 mL/g. The ratio of the sum of the mesopore and macropore volumes to the total pore volume may be greater than about 0.3, preferably greater than about 0.4, preferably greater than about 0.6, and most preferably between about 0.7 and about 1.

The water filter material 58 may comprise from about 7 grams (herein, "g") to about 600 g, from about 15 g to about 300 g, or from about 30 g to about 170 g of activated carbon particles (as described in U.S. application Ser. Nos. 10/464,210, and 10/464,209) to treat low-pressure untreated drinking water. The activated carbon particles may have a bulk density from about 0.2 g/mL to about 0.8 g/mL, from about 0.3 g/mL to about 0.7 g/mL, or from about 0.35 g/mL to about 0.65 g/mL. Activated carbon may be formed into blocks by processes described in U.S. Pat. Nos. 4,664,673; 4,859,386; 5,019,311; 5,189,092; 5,249,948; 5,679,248; 5,679,248; 5,928,588; 5,976,432; and WO 98/43796 according to the following activated carbon block specifications:

Flow Rate:

From about 5 mL/min/inch of block length at 10 psi to about 100 mL/min/inch of block length at 10 psi.

Target Fill Time:

From about 20 minutes to about 10 hours for 3,000 mL of treated drinking water at 10 psi.

Dimensions:

Block Length: From about 2 inches to about 6 inches.

Outer Diameter: From about 1.5 inches to about 4 inches.

Inner Diameter: From about 0.3 inches to about 1 inch.

Minimum Average Fluid Contact Time:

At least about 3 seconds.

A water filter material 58 comprising activated carbon particles may enable the water filter device 20 to treat about 100% of all the untreated drinking water that enters the water filter device 20 via the connector 22. The only water that may be wasted (that is, which enters the water filter device 20 and is not treated) is that water which may remain in the connector 22, connector hose 24, and filter vessel 28 when the filter vessel 28 is removed for changing of the water filter 26 (the wasted water may be less than about 0.5% when compared to the volume of untreated drinking water treated by the water filter 26 over its life). Thus, about all (100%) of the untreated drinking water which enters the water filter device 20 via said connector 22 is made available for drinking from the storage housing 30.

As mentioned above, the water filter 26 may further comprise a pre-filter 120. The pre-filter 120 may prevent clogging of the filter material 58, especially in geographies where there is a high level of particulate or organic contamination (including bacteria slime). The pre-filter 120 may include, but is not limited to, one or a combination of melt-blown polypropylene, non-woven polymer, micro-glass fiber, non-woven cellulose filter material, etc. The pre-filter 120 may be one or multiple layers.

The water filter 26 may have a F-BRL greater than about 2 logs, greater than about 3 logs, greater than about 4 logs, and greater than about 6 logs, and a F-VRL greater than about 1 log, greater than about 2 logs, greater than about 3 logs, and greater than about 4 logs. Further, the water filter 26 may, in addition to above-said F-BRL/F-VRL properties, have an output from about 5 mL/min to about 2,000 mL/min, from about 25 mL/min to about 1,000 mL/min, or from about 50 mL/min to about 400 mL/min when treating low-pressure untreated drinking water.

(i) Water Filter Material Example 1

About 18.3 g of Nuchar® RGC mesoporous and basic activated carbon powder (with $D_{V,0.5}$ equal to about 45 µm) from MeadWestvaco Corp. of Covington, Va., is mixed with about 7 g of Microthene® low-density polyethylene (LDPE) FN510-00 binder of Equistar Chemicals, Inc. of Cincinnati, Ohio, and about 2 g of Alusil® 70 aluminosilicate powder from Selecto, Inc., of Norcross, Ga. The mixed powders are then poured into a circular aluminum mold with about 3 in. (about 7.62 centimeters (herein, "cm")) internal diameter and about 0.5 in. (about 1.27 cm) depth. The mold is closed and placed in a heated press with platens kept at about 204° C. for 1 h. Then, the mold is allowed to cool to room temperature, opened, and the axial flow filter is removed. The characteristics of the filter are: face area: about 45.6 centimeters squared (herein "cm$^2$"; filter depth: about 1.27 cm; filter total volume: about 58 mL; filter porosity (for pores greater than about 0.1 micrometers (herein "µm"): about 0.43; and filter material pore volume (for pores greater than about 0.1 µm): about 25 mL (as measured by mercury porosimetry).

(ii) Water Filter Material Example 2

About 26.2 g of coconut microporous and basic activated carbon powder (with $D_{V,0.5}$ equal to about 92 µm) is mixed with 7 g of Microthene® low-density polyethylene (LDPE) FN510-00 binder of Equistar Chemicals, Inc. of Cincinnati, Ohio, and about 2 g of Alusil® 70 aluminosilicate powder from Selecto, Inc., of Norcross, Ga. The mixed powders are then poured into a circular aluminum mold with about 3 in. (about 7.62 cm) internal diameter and about 0.5 in. (about 1.27 cm) depth. The mold is closed and placed in a heated press with platens kept at about 204° C. for 1 h. Then, the mold is allowed to cool to room temperature, is opened, and the axial flow filter is removed. The characteristics of the filter are: face area: about 45.6 cm$^2$; filter depth: about 1.27 cm; filter total volume: about 58 mL; filter porosity (for pores greater than about 0.1 µm): about 0.44; and filter material pore volume (for pores greater than about 0.1 µm): about 25.5 mL (as measured by mercury porosimetry).

D. The Filter Vessel

Figure 5:
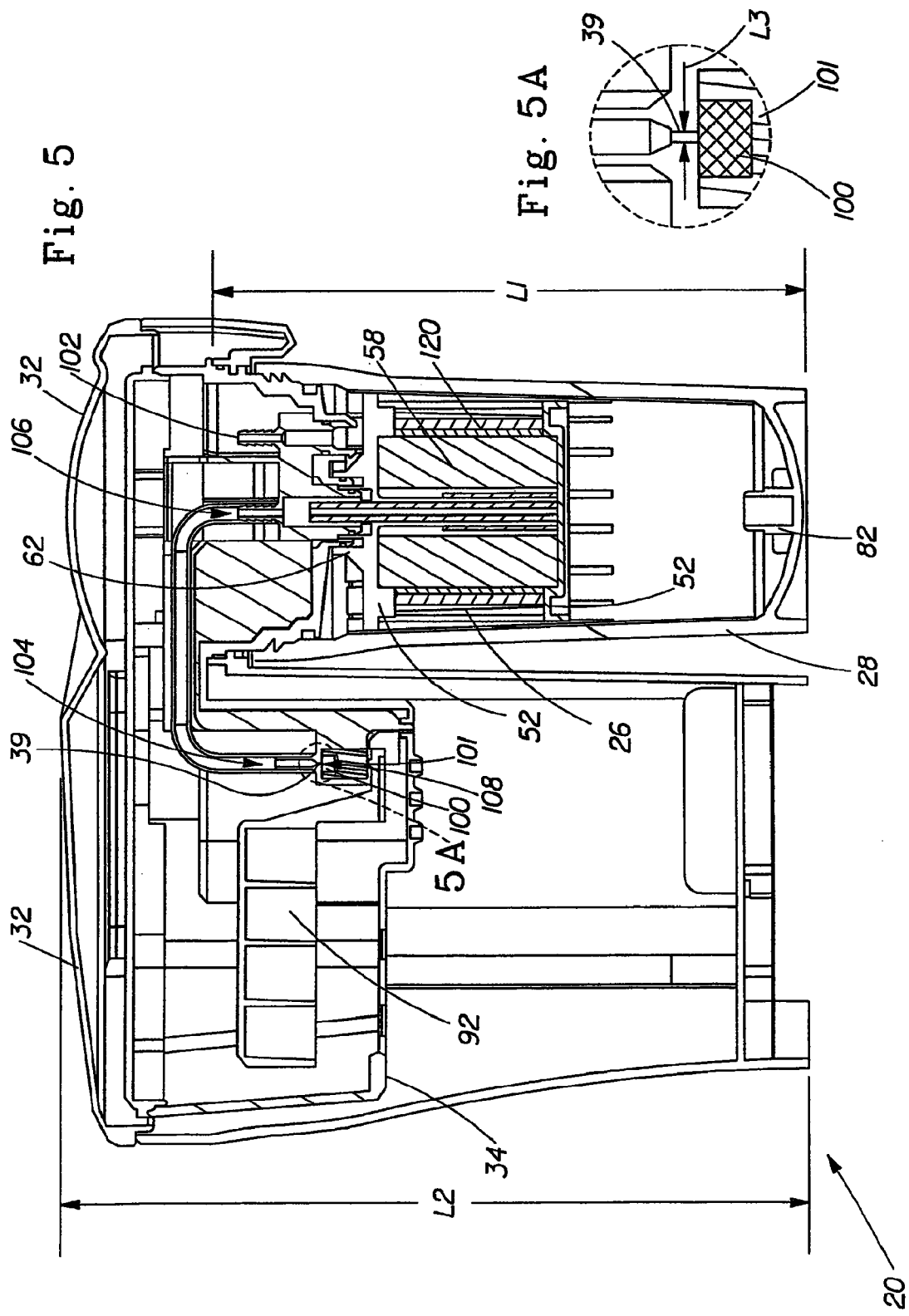
FIG. 5 is a cross-sectional side view of the water filter device of FIG. 1 taken along the line A-A.

As shown previously in FIG. 1, the filter vessel 28 may be shaped for surrounding the water filter 26 (which may be connected to the control head 34, as shown in FIG. 5, and as described in U.S. Application No. 60/473,271) and for releasably connecting (e.g., friction fitted, threadably fitted, bolted, screwed, fastened, snap fitted, latched, etc.) and fluidly sealing to the control head 34, or other part of the water filter device 20, such that the filter vessel 28 may be in fluid communication with the control head 34. O-rings, u-cups, other elastomeric seals or gaskets, etc. (not shown) may be used to achieve a fluid seal. The filter vessel 28 may be "easy-to-open", such that the average adult is able to connect and disconnect it from the control head 34 using only their hands (that is, without any tools), such that only from about 5 inch-pounds (herein, "inch-lbs") to about 100 inch-lbs, from about 7 inch-lbs to about 50 inch-lbs, or from about 10 inch-lbs to about 30 inch-lbs of torque is required to open it. Alternatively, the filter vessel 28 may be fully or partially released from the water filter device 20 via actuation of a button (not shown), such that the button releases a latch (not shown) or a tab (not shown) which holds the filter vessel 28 in an attached orientation to the water filter device 20. The button may alternatively impact or cause the impact of the filter vessel 28 such that it clears the latch or tab.

The filter vessel 28 may be shaped like a capsule, having an open first end 76, a closed second end 78, and an interior volume 80. The filter vessel 28 may be made from one or more of a variety of materials, including, but not limited to, one or a combination of plastics, metal and alloys thereof, fiberglass, etc.

Figure 4:
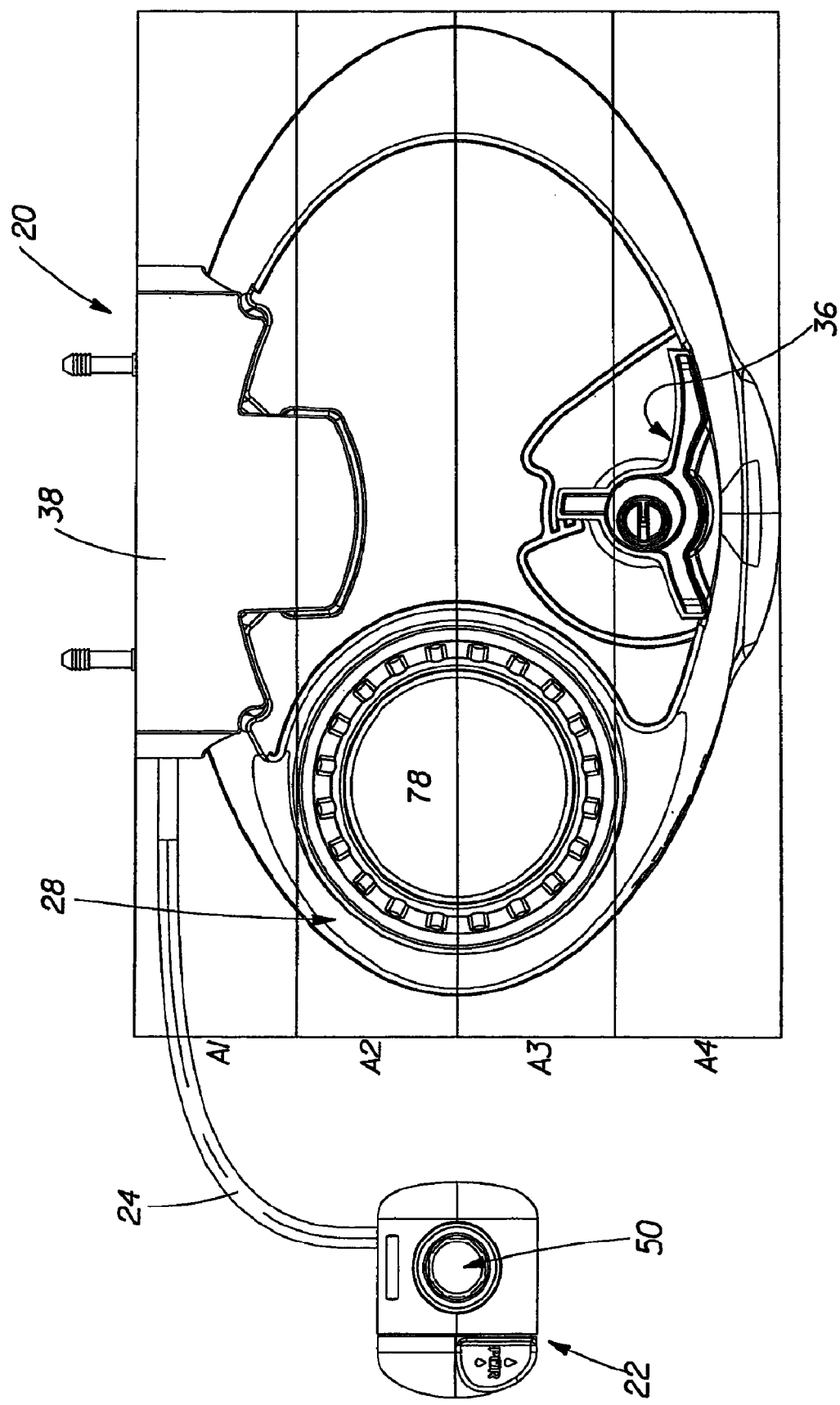
FIG. 4 is a bottom plan view of the water filter device of FIG. 1.

The filter vessel 28 may have a longitudinal axis 82, and may be vertically oriented when connected to the control head 34. Further, as shown in FIG. 4, the filter vessel 28 may be oriented in the front portion and/or a combination of the front and side portions, Areas A2, A3, and A4 (that is, about the front 75% of the water filter device 20) versus the back portion, Area A1 (that is, about the back 25% of the water filter device 20).

Being front or side orientated, and/or easy-to-open may increase user compliance with changing the water filter 26. Additionally, the fewer elements that the user has to take apart to change the water filter 26, the less chance there is of contamination of the internal parts of the water filter device 20. When the filter vessel 28 is front and/or side oriented and easy-to-open, it may be attached and/or removed, and the filter 26 may be changed, such that the water filter device 20 may remain in the same position as it is when being used by the user (which may normally be with the dispenser 36 toward the user, and may include the water filter device 20 being wall-mounted or set on a countertop).

The interior volume of the filter vessel 28 may be from about 75 milliliters (herein, "mL") to about 3,000 mL, from about 150 mL to about 2,000 mL, or from about 300 mL to about 1,500 mL. As shown in FIG. 5, the distance L1, the height of the filter vessel 28, may be about 5 centimeters (herein, "cm") to about 75 cm, from about 7 cm to about 50 cm, or from about 10 cm to about 25 cm. The diameter of the filter vessel 28 may be about 2 cm to about 40 cm, from about 4 cm to about 20 cm, or from about 6 cm to about 12 cm.

The height of the filter vessel 28 (or water filter 26 in the case the filter housing 52 is used as a filter vessel 28) may be less than 75%, less than 50%, or less than 25% of the height of the water filter device 20 (the distance L2, the height of the water filter device 20, may be from about 5 cm to about 80 cm, from about 10 cm to about 40 cm, or from about 20 cm to about 30 cm). Thus, if the water filter device 20 is set on a planar surface (e.g., a countertop), the bottom of the filter vessel 28 (or water filter 26 in the case the filter housing 52 is used as a filter vessel 28) may be from about 1 mm to about 70 mm, from about 3 mm to about 50 mm, or from about 5 mm to about 25mm from the planar surface, such that the filter vessel 28 (or water filter 26 in the case the filter housing 52 is used as a filter vessel 28) may be easily removed from the water filter device 20.

Alternatively, as described in U.S. patent application Ser. No. 10/424,200, the filter vessel 28 may completely encase the water filter 26 such that the water filter 26 physically connects to the filter vessel 28, and the filter vessel 28 physically connects to the control head 34 placing the filter vessel 28 and the water filter 26 in fluid communication with the control head 34. Such a filter vessel 28 may, instead of having an open first end 76, have one or more smaller openings which place it in fluid communication with the control head 34.

Alternatively, the filter housing 52 may be used as a filter vessel 28 (such that the filter housing 52 encases, rather than caps, the filter material 58, such that the filter housing 52 releasably connects (e.g., friction fitted, threadably fitted, bolted, screwed, fastened, snap fitted, latched, etc.) and fluidly seals to the control head 34, or to another part of the water filter device 20, such that the water filter 26 may be in fluid communication with the control head 34. In such an application, the filter housing 52 may be disposable. Disposable filter housings 52 may not be practical in economically depressed geographies as cost of water filter device 20 use is often increased by such use.

Figure 6:
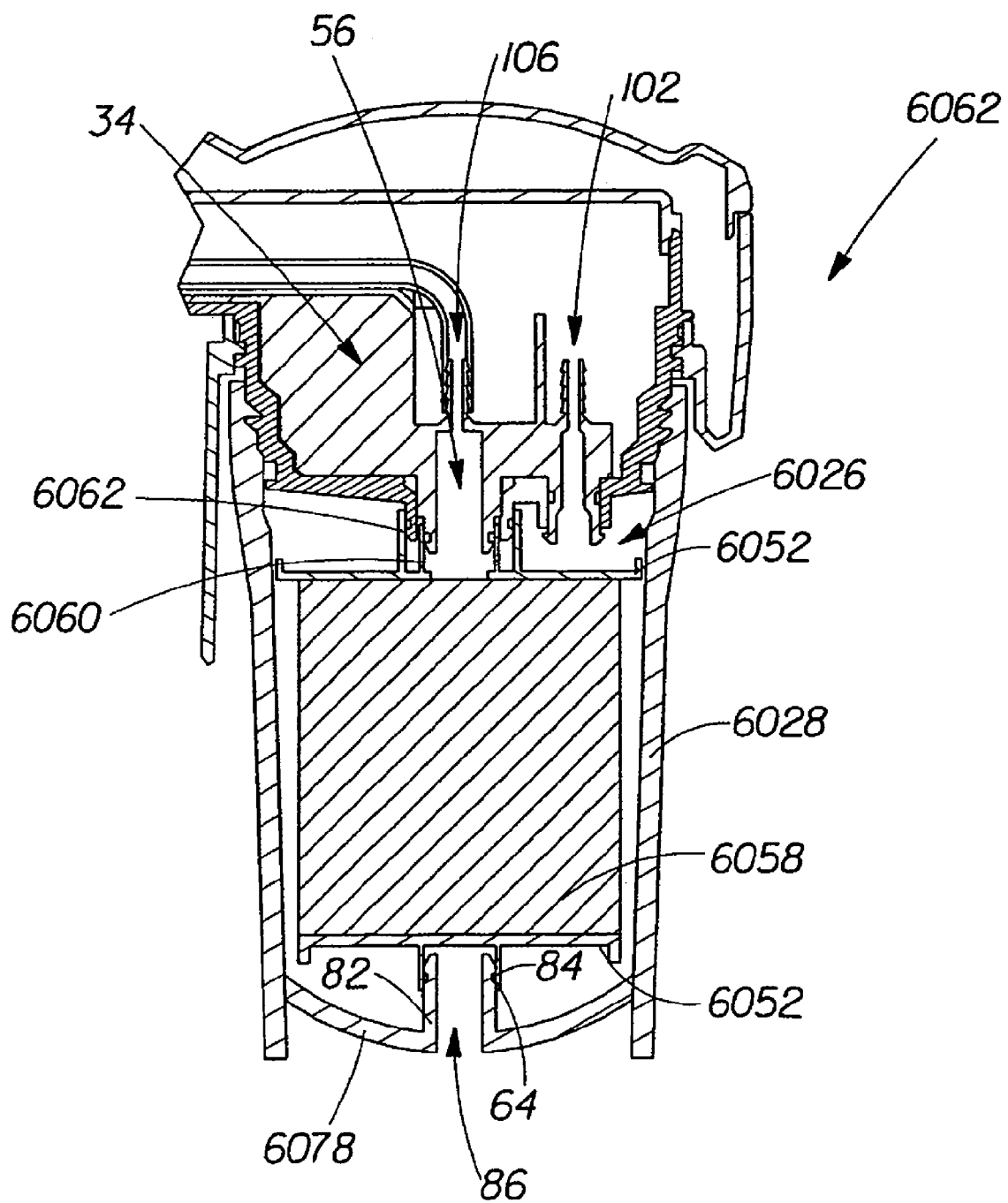
FIG. 6 is a partial cross-sectional side view of an alternate embodiment of the water filter device of FIG. 1 taken along the line A-A, wherein an opening is formed through the filter vessel.

The water filter 26 may be seated within the filter vessel 28 such that when the filter vessel 28 is removed from the control head 34, the water filter 26 remains within the interior volume of the filter vessel 28. As described in U.S. Patent App. No. 60/473,271, and as shown in FIG. 6, the filter vessel 6028 may have a plug housing 82 located at its second end such that an opening 86 through the filter vessel 6028 is formed. An o-ring 84 may surround the plug housing 82, or the third tube 64 of the water filter 6026 may surround the plug housing 82, such that the third tube 64 of the water filter 6026 and the plug housing 82 of the filter vessel 6028 sealingly connect. Thus, when the filter vessel 6028 is removed from the control head 34, and is filled with untreated drinking water, it may be taken to a sink in the upright position, and the water filter 6026 may be removed from it, unsealing the plug housing 82, allowing untreated drinking water to egress from the opening 86 of the filter vessel 6028.

E. The Storage Housing

As shown in FIG. 1, the storage housing 30 may have an open top portion 31 for receiving treated drinking water, a closed bottom portion 33, and an interior volume 35. The storage housing 30 may also have an opening in its bottom portion 33, for receiving the dispenser 36. The storage housing 30 may be shaped for holding a predetermined amount of treated drinking water. The storage housing may be any shape capable of holding a predetermined amount of treated drinking water. The storage housing 30 may be made from one or more of a variety of materials, including, but not limited to, one or a combination of plastics, metal and alloys thereof, fiberglass, etc.

The storage housing 30 may have a vertically oriented window 88 for displaying the level of treated drinking water contained within the storage housing 30. Other means, such as a tube with a buoyant object (e.g., a buoyant colored bead) may also be used to indicate the level of treated drinking water within the storage housing 30.

The storage housing 30, or a portion thereof, may be separably removed from the water filter device 20 such that it is removed without any other component of the water filter device 20 being attached to or contained within it. The storage housing 30 may then be more easily cleaned as no other component of the water filter device 20 would obstruct a portion of the storage housing 30 to be cleaned, and as the storage housing 30 would be able to be oriented in any manner that the user finds most accommodating for cleaning it. Further, when the storage housing 30 is removed, cleaners may be used that would otherwise not be used because the cleaners would migrate into internal parts of the control head 34 if the storage housing 30 was cleaned with cleaners while attached to the water filter device 20. However, when the storage housing 30 is removed, such cleaners may be used and the storage housing 30 may be thoroughly washed. When the storage housing 30 is removed, the other components may also be exposed, and more easily cleaned.

The storage housing 30 may hold from about 0.5 liters (herein, "L") to about 20 L, from about 1 L to about 12 L, or from about 2 L to about 6 L of treated drinking water. Its capacity allows its users to obtain water during times when there is no water pressure. The average household uses from about 4 liters per day (herein "L/day") to about 10 L/day of treated drinking water for cooking and drinking per day.

F. The Storage Housing Cover

As previously shown in FIG. 1, the storage housing cover 32 may be used for completely or partially covering the open end of the storage housing 30. The storage housing cover 32 may prevent contaminants from contaminating the volume of treated drinking water collected in the storage housing 30. The storage housing cover 32 may be completely removable, or may be operably attached (e.g., hinged, sliding, etc.) to the storage housing 30.

G. The Control Head

Figure 7:
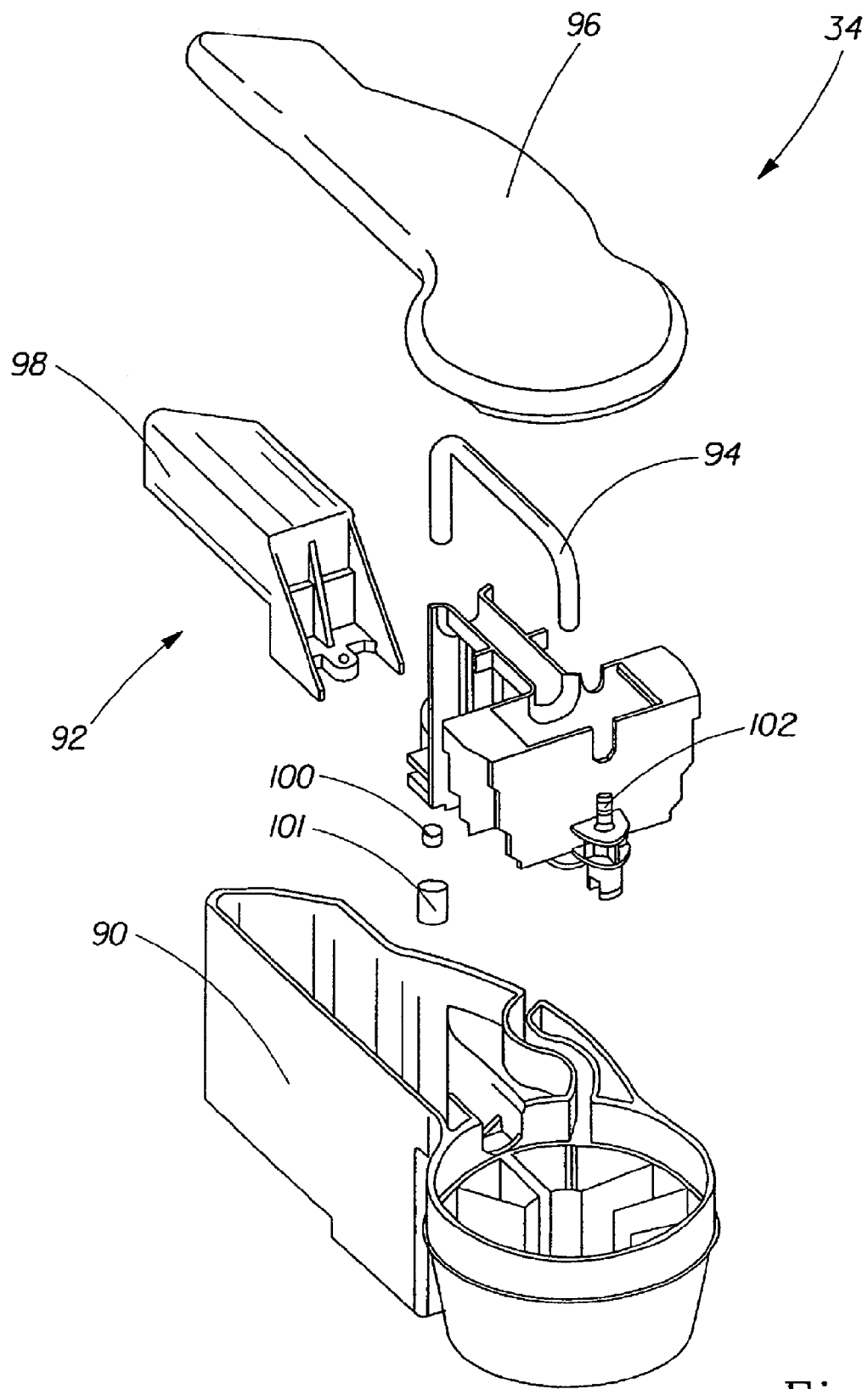
FIG. 7 is an exploded perspective view of the control head of the water filter device of FIG. 1.

As shown in FIG. 7, the control head 34 may comprise a control head housing 90, a shutoff valve 92, a control head hose 94, and/or a control head lid 96. The control head 34 may fluidly connect the water filter 26 and the storage housing 30, such that the two are in fluid communication, and such that a portion of the control head 34 is within the interior volume of the storage housing 30 and/or the filter vessel 28. The portion of control head housing 90 which may be within the interior volume of the storage housing 30 may have an open bottom portion such that as treated drinking water in the storage housing 30 rises, it may also rise within the control head housing 90, and may contact the shutoff valve 92 within the control head housing 90.

The shutoff valve 92 may comprise a float 98 and/or a stopper 100, and a stopper casing 101 connected to its base portion. The stopper 100 may arrest the flow of treated drinking water into the storage housing 30 (explained in more detail below). The shutoff valve 92 may, alternatively, include a diaphragm, piston with a spring that responds to the water pressure of a full tank to move a stopper, etc. (not shown). As previously shown in FIG. 5, the control head 34 may comprise a first control head inlet 102 and second control head inlet 104, and a first control head outlet 106 and second control head outlet 108. The second control head inlet 104 and first control head outlet 106 may be connected by a control head hose 94. The shutoff valve 92 may be contained within the control head housing 90, such that the control head lid 96 encases it. The float 98 may be flexibly (e.g., pivotally) connected to the control head housing 90 such that as treated drinking water rises within the control head housing 90, the float 98 may rise, and the stopper 100 and the stopper casing 101 may fluidly seal the second control head outlet 108, thus arresting the flow of water into the storage housing 30. The control head 34 may be made from one or more of a variety of materials, including, but not limited to, one or a combination of plastics, metal and alloys thereof, fiberglass, rubber, etc.

Because the stopper 100 automatically arrests the flow of water through the water filter device 20, a user may turn on the untreated drinking water source and tend to other things because the user may depend on the water filter device 20 to stop the filtering of untreated drinking water once the capacity of the storage housing 30 is reached, thus preventing an overflow situation (this feature makes the water filter device 20 self-filling).

H. The Dispenser

As shown in FIG. 1, the dispenser 36 may be sealingly connected (using o-rings 117) to an opening at the bottom portion 33 of the storage housing 30. The dispenser 36 may dispense treated drinking water stored within the interior volume of the storage housing 30. The dispenser 36 may comprise a dispenser body 110, a dispenser handle 112, a dispenser inlet 116, and a dispenser outlet 118. The dispenser handle 112 (by turning, flipping, sliding, etc.) may be used to direct the flow of treated drinking water. The dispenser 36 may be made from one or more of a variety of materials, including, but not limited to, one or a combination of plastics, metal and alloys thereof, fiberglass, etc.

I. The Wall-Mount Bracket

Figure 8:
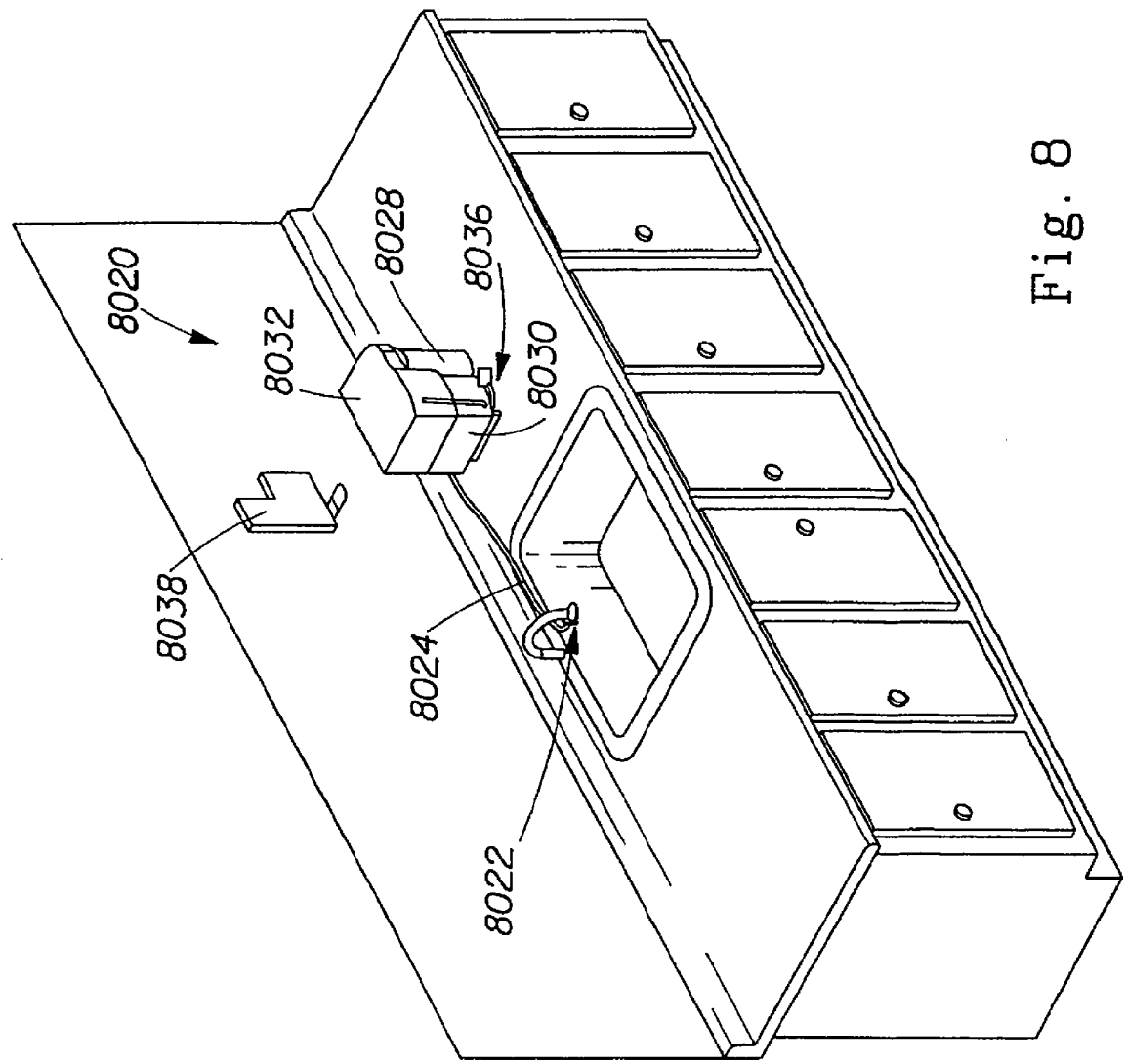
FIG. 8 is a perspective view of an alternate embodiment the water filter device of FIG. 1, wherein the wall-mount bracket is fixed on a wall.

As shown in FIG. 1, and as shown in FIG. 8, the wall-mount bracket 38, 8038 may be shaped for connecting to a planar wall or cabinet, and for releasably connecting to the storage housing 30, 8030. The connection to the wall-mount bracket 38, 8038 may be at the back, side, top and/or bottom portion of the storage housing 30, 8030. The wall-mount bracket 38, 8038 may be made from one or more of a variety of materials, including, but not limited to, one or a combination of plastics, metal and alloys thereof, fiberglass, rubber, etc.

J. The Flow Regulator

As shown in FIG. 5-A, the flow regulator 39 may be the opening in the housing making up the second control head outlet 108, such that the diameter of the opening, distance L3, may be a diameter from about 0.2 mm to about 6 mm, from about 0.4 mm to about 3 mm, or from about 0.7 mm to about 1.5 mm. The flow regulator 39 may be any predefined opening capable of restricting the flow rate to maintain an average fluid contact time of at least about 3 seconds, at least about 4 seconds, and/or at least about 5 seconds at a pressure of up to about 100 psi. The flow regulator 39 may additionally be a hose having a predetermined diameter and/or a flow washer that is made of flexible material that reduces the hole size as flow rate increases, etc.

The connector hose 24, the connector inlet 46, the first connector outlet 48, the second connector outlet 50, the first control head inlet 102, the second control head inlet 104, the first control head outlet 106, or the second control head outlet 108 may be sized to slow the flow of higher pressure water through the water filter device 20 without impacting the flow of low-pressure water through the water filter device 20. The flow regulator 39 may be any part within the pressurized part of the system that creates a pressure drop. The flow regulator 39 allows for the water filter device 20 to be operable (that is, a water filter device 20 that fills the storage housing 30 at a rate of at least 5 mL/min) at low-pressures, and, at the same time, efficacious at higher pressures.

K. The Life Display

As previously shown in FIG. 1, the water filter device 20 may comprise a life display 40 for indicating the life remaining, or life used, for the water filter 26. The life display 40 may be located on the storage housing cover 32, however, it may be located anywhere on the water filter device 20 such that it is visible to the user. The life display 40 may be a tear-away calendar, a liquid crystal display, a light emitting diode, a light bulb, or the like. The life display 40 may be a timer, where life of the water filter 26 is based on time (i.e., it indicates end of water filter 26 life based solely on time, regardless of the volume of water treated by the water filter 26) or may be based on volume (i.e., it indicates end of water filter 26 life based on the volume of water treated by the water filter 26).

End of water filter 26 life may be depicted by the appearance or disappearance of symbols (e.g., raindrops, crosses, etc.) and/or different colored lights (e.g., red, yellow, green, etc.). The life display 40 may be reset via insertion or removal of a new water filter 26, or by a reset button, switch, lever, etc. The life display 40 may be powered by alternating current, direct current, battery (including a long-life battery), solar power, etc.

III. Test Procedures

A. BET Test Procedure

The BET specific surface area and pore volume distribution are measured using a nitrogen adsorption technique, such as that described in ASTM D 4820-99, by multipoint nitrogen adsorption, at about 77K with a Coulter SA3100 Series Surface Area and Pore Size Analyzer manufactured by Coulter Corp., of Miami, Fla. This process can also provide the micropore, mesopore, and macropore volumes.

B. Point of Zero Charge Test Procedure

About 0.010 M aqueous KCl solution is prepared from reagent grade KCl and water that is freshly distilled under argon gas. The water used for the distillation is deionized by a sequential reverse osmosis and ion exchange treatment. About 25.0 mL volume of the aqueous KCl solution is transferred into six, about 125 mL flasks, each fitted with a 24/40 ground glass stopper. Microliter quantities of standardized aqueous HCl or NaOH solutions are added to each flask so that the initial pH ranges between about 2 and about 12. The pH of each flask is then recorded using an Orion model 420A pH meter with an Orion model 9107BN Triode Combination pH/ATC electrode, manufactured by Thermo Orion Inc., of Beverly, Mass., and is called "initial pH". About 0.0750±0.0010 g of activated carbon particles are added to each of the six flasks, and the aqueous suspensions are stirred (at about 150 rpm) while stoppered for about 24 hours at room temperature before recording the "final pH".

C. Bulk Oxygen Percentage by Weight Test Procedure

The bulk oxygen percentage by weight is measured using the PerkinElmer Model 240 Elemental Analyzer (Oxygen Modification; PerkinElmer, Inc.; Wellesley, Mass.). The technique is based on pyrolysis of the sample in a stream of helium at about 1000° C. over platinized carbon. The carbon samples are dried overnight in a vacuum oven at about 100° C.

D. ORP Test Procedure

The ORP is measured using the platinum redox electrode Model 96-78-00 from Orion Research, Inc. (Beverly, Mass.), and following the ASTM standard D 1498-93. The procedure involves the suspension of about 0.2 g of carbon in about 80 mL of tap water, and reading the electrode reading, in mV, after about 5 min of gentle stirring.

E. F-BLR Test Procedure

The housings for the axial flow filters with mesoporous carbon are made from Teflon® and consist of 2 parts, i.e., a lid and a base. Both parts have an outside diameter of about 12.71 cm (about 5") and inside diameter of about 7.623 cm (about 3"). The lid counter sets in the base with an o-ring (about 3" ID and about ⅛" thickness) compression seal. The inlet and outlet hose barb connectors are threaded into the lid and base with about 1/16" NPT pipe threads. About ½" thick by about 2¾" OD stainless steel diverter (with about 3/16" hole on the upstream side and about 6 mesh screen on the downstream side) is counter set into the lid of the housing. The function of the diverter is to distribute the inlet flow over the entire face of the filter. The lid and base of the housing engage such that a compression seal exists sealing the filter within the housing. The lid and the base held together using four about ¼" fasteners.

The filter is mounted inside the housing and water contaminated with about $1 \times 10^8$ CFU/L *E. coli* flows through at a flowrate of about 200 mL/min. The total amount of water flowing in can be about 2,000 filter material pore volumes or more. The *E. coli* bacteria used are the ATCC # 25922 (American Type Culture Collection, Rockville, Md.). The *E. coli* assay can be conducted using the membrane filter technique according to process # 9222 of the 20$^{th}$ edition of the "*Standard Processes for the Examination of Water and Wastewater*" published by the American Public Health Association (APHA), Washington, D.C. Other assays known in the art can be substituted (e.g. COLILERT®). The limit of detection (LOD) is about $1 \times 10^2$ CFU/L when measured by the membrane filter technique, and about 10 CFU/L when measured by the COLILERT® technique. Effluent water is collected after the flow of about the first 2,000 filter material pore volumes, assayed to count the *E. coli* bacteria present, and the F-BLR is calculated using the definition.

F. F-VLR Test Procedure

The housings for the axial flow filters with mesoporous carbon are the same as those described in the F-BLR procedure above. Water contaminated with about $1 \times 10^7$ PFU/L MS-2 flows through a housing/filter system at a flowrate of about 200 mL/min. The total amount of water flowing in can be about 2,000 filter material pore volumes or more. The MS-2 bacteriophages used are the ATCC # 15597B (American Type Culture Collection, Rockville, Md.). The MS-2 assay can be conducted according to the procedure by C. J. Hurst, *Appl. Environ. Microbiol.*, 60(9), 3462 (1994). Other assays known in the art can be substituted. The limit of detection (LOD) is $1 \times 10^3$ PFU/L. Effluent water is collected after the flow of about the first 2,000 filter material pore volumes, assayed to count the MS-2 bacteriophages present, and the F-VLR is calculated using the definition.

IV. Water Filter Device Example

About 37 g of Nuchar® RGC mesoporous and basic activated carbon powder from MeadWestvaco Corp. of Covington, Va., is mixed with about 14 g of Microthene® low-density polyethylene (LDPE) FN510-00 binder of Equistar Chemicals, Inc. of Cincinnati, Ohio, and about 4 g of Alusil® 70 aluminosilicate powder from Selecto, Inc., of Norcross, Ga. The mixed powders are then poured into a circular aluminum mold. The mixed powders are then poured into an aluminum mold. The mold is closed and placed in a heated press with platens kept at about 204° C. for 1 h. Then, the mold is allowed to cool to room temperature, opened, and the filter material 58 is removed. The characteristics of the filter material 58 include: an outside diameter of 5.08 cm, a core diameter of 1.6 cm, a filter length of 6.35 cm, and a filter volume of 116 mL.

The filter material 58 is capped with a filter housing 52 as described above (using hot melt adhesive) to make up a water filter 26 as described above. The water filter 26 is inserted onto a control head 34 as described above. A filter vessel 28 is attached to the control head 34 as described above.

The connector inlet 46 is connected to an untreated drinking water source and a user turns on the untreated drinking water source. Untreated drinking water comprising $1 \times 10^6$ viruses per liter and $1 \times 10^7$ bacteria per liter flows into the connector inlet 46 through the connector body 42, bypassing the first connector outlet 48 connected to the connector hose 24, and bypass the rest of the water filter device 20, and then through the second connector outlet 50.

The user turns the connector handle 44 ninety degrees, from an open position to a closed position, such that the connector valve directs the flow of untreated drinking water to and through the first connector outlet 48 instead of the second connector outlet 50. Untreated drinking water then travels through the connector hose 24, into the first control head inlet 102, then into the filter vessel 28, filling the filter vessel 28, and entering the water filter 26 via the filter inlet 54. The untreated drinking water then radially enters the water filter material 58, and radially flows through the water filter material 58, being treated (bacteria reduced by 6 logs and viruses reduced by 4 logs), and then radially enters the core region 70 of the water filter material 58, and then axially flows through the core region 70, to and through the filter outlet 56.

Treated drinking water then flows from the filter outlet 56, through the first control head outlet 106, then through the control head hose 94, then through the second control head inlet 104, then through the second control head outlet 108, into the storage housing 30.

Treated drinking water then fills the interior volume 35 of the storage housing 30, meeting the dispenser 36 which is in a closed position, such that the flow of water may not pass through. Treated drinking water continues to fill the storage housing 30 such that it also begins to engulf the control head housing 90 until the float 98 is raised, thus raising the stopper 100 to a position which fluidly seals the second control head outlet 108, thus stopping the flow of treated drinking water into the storage housing 30.

Treated drinking water is dispensed through the dispenser 36 by moving the dispenser handle 112 to an open position, such that treated drinking water flows into the dispenser inlet 116, through the dispenser body 110, and through the dispenser outlet 118. The dispensed treated drinking water may be captured in a container.

V. Modular Units

Figure 9:
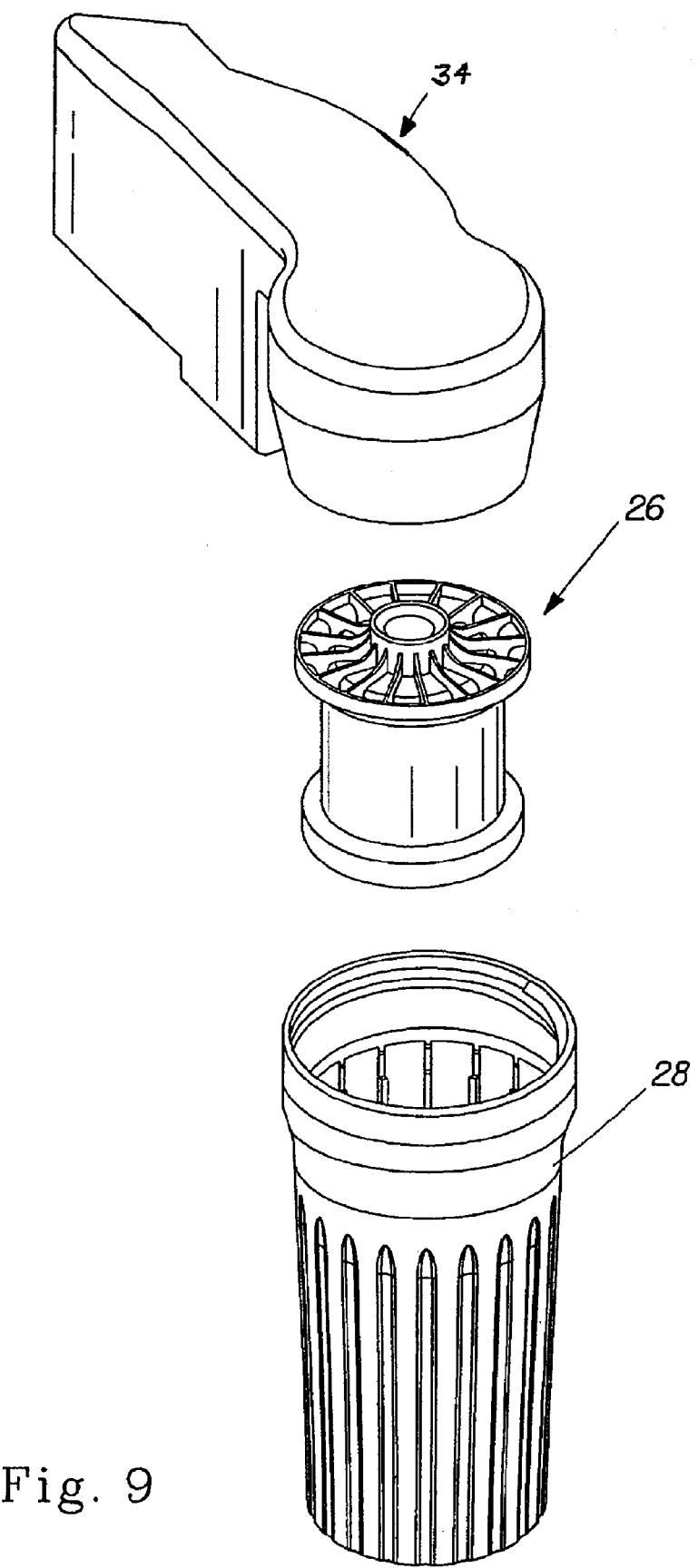
FIG. 9 is an exploded perspective view of the control head, water filter, and filter vessel of the water filter device of FIG. 1.

As shown in FIG. 9, the water filter device 20 may be used as a modular unit that may comprise the connector (not shown), the control head 34, the water filter 26, and/or the filter vessel 28. The same modular unit may be releasably (e.g., friction fitted, threadably fitted, bolted, screwed, fastened, snap fitted, latched, etc.) or permanently (e.g., molded, adhesively bonded, soldered, welded, hot plate welded, etc.) connected to different storage housings (e.g., 30). Thus, a manufacturer may produce the same modular unit for incorporation into a line of different storage housings (e.g., the same modular unit may be placed in storage housings having different interior volumes, colors, shapes, features, etc.). Also, a consumer may interchangeably use the same modular unit to different storage housings (e.g., countertop storage housings, refrigerator storage housings, etc.).

The present invention may additionally include information that will communicate to the consumer, by words and/or by pictures, that use of the invention will provide benefits associated with the water filter device 20, as well as providing said benefits at a minimum flow rate for a predetermined number of gallons. This information may include a claim of superiority over other water filter devices and products. Accordingly, the use of packages in association with information that will communicate to the consumer, by words and or by pictures, that use of the invention will provide the particular and related benefits as previously mentioned above. The information can include, e.g., advertising in all of the usual material, as well as statements and icons on the package, or the water filter device 20 itself, to inform the consumer.

All documents cited above are incorporated herein by reference; the citation of any document is not to be construed as an admission that it is prior art with respect to the invention.

While particular embodiments of the invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of treating low-pressure untreated water, said method comprising:
   (a) passing low-pressure untreated water from a source of low-pressure untreated water through a low-pressure water filter device, such that the average fluid contact time is greater than about 2 seconds, the low-pressure water filter device comprises a storage housing and mesoporous activated carbon filter particles, wherein
  (i) a sum of mesopore and macropore volumes of the mesoporous activated carbon filter particles is between about 0.2 mL/g and about 2 mL/g, wherein mesopore means an intra-particle pore having a diameter between 2 nm and 50 nm, and macropore means an intra-particle pore having a diameter greater than 50 nm, and
  (ii) a total pore volume of the mesoporous activated carbon filter particles is greater than about 0.4 mL/g and less than about 3 mL/g;
(b) removing bacteria and viruses from the low-pressure untreated water with the low-pressure water filter at a level of Filter Bacteria Log Removal of greater than about 2 logs and a Filter Viruses Log Removal of greater than about 1 log to produce treated drinking water; and
(c) filling the storage housing with treated drinking water at a rate greater than about 5 mL/min.

2. The method of claim 1, wherein the mesoporous activated carbon filter particles comprise mesoporous and basic activated carbon filter particles.

3. The method of claim 1, wherein the step of removing the bacteria and viruses from the low-pressure untreated water comprises removing bacteria and viruses with the low-pressure water filter at a level of Filter Bacteria Log Removal of greater than about 3 logs and a Filter Viruses Log Removal of greater than about 2 logs.

4. The method of claim 1, wherein the step of removing the bacteria and viruses from the low-pressure untreated water comprises removing bacteria and viruses with the low-pressure water filter at a level of Filter Bacteria Log Removal of greater than about 4 logs and a Filter Viruses Log Removal of greater than about 3 logs.

5. The method of claim 1, further comprising a step of passing the low pressure untreated water through a prefilter prior to passing the low-pressure untreated water through the low-pressure water filter, wherein the prefilter is selected from the group consisting of melt-blown polypropylene, non-woven polymer, micro-glass fiber, and non-woven cellulose filter material.

6. The method of claim 1, wherein a ratio of a sum of mesopore and macropore volumes to a total pore volume of mesoporous activated carbon filter particles is greater than about 0.3.

7. The method of claim 1, further comprising a step of arresting the filling of the storage housing with treated drinking water when an automatic shutoff valve on the low-pressure water filter device is activated.

8. The method of claim 7, wherein the automatic shutoff valve comprises a float.

9. The method of claim 1, further comprising a step of dispensing the treated drinking water through utilization of a dispenser in fluid communication with the storage housing.

10. The method of claim 1, wherein the low-pressure water filter device is a non-electric water filter device.

11. The method of claim 1, wherein the low-pressure water filter device further comprises a flow regulator, wherein the flow regulator regulates the flow of the untreated water such that the average fluid contact time is greater than about 2 seconds up to about 120 psi.

12. The method of claim 11, wherein the flow regulator regulates the flow of the untreated water such that the average fluid contact time is greater than about 4 seconds up to about 120 psi.

13. A method of treating low-pressure untreated drinking water, said method comprising:

(a) providing a low-pressure water filter device comprising:
  (i) a connector for providing fluid communication between said low-pressure water filter device and an untreated drinking water source;
  (ii) a low-pressure water filter in fluid communication with said connector, said low-pressure water filter comprising a water filter material, said water filter material comprising filter particles consisting of mesoporous activated carbon;
  (iii) a storage housing in fluid communication with said low-pressure water filter, said storage housing utilized for storing treated drinking water treated by said low-pressure water filter;
  (iv) an automatic shutoff valve in fluid communication with said storage housing, said automatic shutoff valve utilized for arresting the flow of treated drinking water into said storage housing;
  (v) a dispenser in fluid communication with said storage housing, said dispenser utilized for dispensing treated drinking water from said storage housing;
  (vi) wherein a sum of mesopore and macropore volumes of said filter particles is between about 0.2 mL/g and about 2 mL/g, wherein mesopore means an intra-particle pore having a diameter between 2 nm and 50 nm, and macropore means an intra-particle pore having a diameter greater than 50 nm;
  (vii) wherein a total pore volume of said filter particles is greater than about 0.4 mL/g and less than about 3 mL/g; and
  (viii) wherein a ratio of the sum of mesopore and macropore volumes to the total pore volume of said filter particles is greater than about 0.3; and
(b) passing low-pressure untreated drinking water from a source of low-pressure untreated drinking water containing bacteria and viruses through said low-pressure water filter, such that the average fluid contact time is greater than about 2 seconds;
(c) removing bacteria and viruses from the low-pressure untreated drinking water with the low-pressure water filter at a level of Filter Bacteria Log Removal of greater than about 2 logs and a Filter Viruses Log Removal of greater than about 1 log;
(d) filling said storage housing with treated drinking water at the rate of at least about 5 mL/min but not greater than about 2,000 mL/min until activating said automatic shutoff valve; and
(e) arresting the flow of said treated drinking water when automatic shutoff valve is activated, such that the flow of treated drinking water into said storage housing is arrested;
wherein said water filter device is a non-electric water filter device, and wherein said water filter device is operable to remove microorganisms from said untreated drinking water flowing into said connector and out of said low-pressure water filter.

14. The method of claim 13, wherein the mesoporous activated carbon comprises mesoporous and basic activated carbon particles.

15. The method of claim 13, wherein the step of removing the bacteria and viruses from the low-pressure untreated drinking water comprises removing bacteria and viruses with the low pressure water filter at a level of Filter Bacteria Log Removal of greater than about 3 logs and a Filter Viruses Log Removal of greater than about 2 logs.

16. The method of claim 15, wherein the step of removing the bacteria and viruses from the low-pressure untreated drinking water comprises removing bacteria and viruses with the low pressure water filter at a level of Filter Bacteria Log Removal of greater than about 4 logs and a Filter Viruses Log Removal of greater than about 3 logs.

17. The method of claim 13, further comprising a step of passing the low pressure untreated drinking water through a prefilter prior to passing the low pressure untreated drinking water through said low pressure water filter, wherein said prefilter is selected from the group consisting of melt-blown polypropylene, non-woven polymer, micro-glass fiber, and non-woven cellulose filter material.

18. The method of claim 13, wherein the automatic shutoff valve comprises a float.

19. The method of claim 13, wherein the low-pressure water filter device further comprises a flow regulator, wherein the flow regulator regulates the flow of the untreated drinking water such that the average fluid contact time is greater than about 2 seconds up to about 120 psi.

20. The method of claim 19, wherein the flow regulator regulates the flow of the untreated drinking water such that average fluid contact time is greater than about 4 seconds up to about 120 psi.

21. The method of claim 13, further comprising a step of dispensing the treated drinking water through utilization of a dispenser in fluid communication with the storage housing.

22. A method of treating low-pressure untreated water, said method comprising:
   (a) connecting a low-pressure water filter to a source of low-pressure untreated water using a connector;
   (b) passing low-pressure untreated water from a source of low-pressure untreated water through the low-pressure water filter device, such that the average fluid contact time is greater than about 2 seconds, the low-pressure water filter device comprises a storage housing and mesoporous activated carbon filter particles, wherein
      (i) a sum of mesopore and macropore volumes of the mesoporous activated carbon filter particles is between about 0.2 mL/g and about 2 mL/g, wherein mesopore means an intra-particle pore having a diameter between 2 nm and 50 nm, and macropore means an intra-particle pore having a diameter greater than 50 nm,
      (ii) a total pore volume of the mesoporous activated carbon filter particles is greater than about 0.4 mL/g and less than about 3 mL/g, and
      (iii) a ratio of the sum of mesopore and macropore volumes to the total pore volume of the mesoporous activated carbon filter particles is greater than about 0.3;
   (c) removing bacteria and viruses from the low-pressure untreated water with the low-pressure water filter at a level of Filter Bacteria Log Removal of greater than about 2 logs and a Filter Viruses Log Removal of greater than about 1 log; and
   (d) filling the storage housing with treated drinking water at a rate greater than about 5 mL/min.

23. The method of claim 22, further comprising a step of arresting the filling of the storage housing with treated drinking water when an automatic shutoff valve on the low-pressure water filter device is activated.

* * * * *